(12) United States Patent
 Matsumoto

(10) Patent No.: US 11,144,109 B2
(45) Date of Patent: Oct. 12, 2021

(54) APPARATUS, METHOD, AND STORAGE MEDIUM FOR CONTROLLING A POWER SAVING STATE IN A SATA STORAGE SYSTEM

(71) Applicant: CANON KABUSHIKI KAISHA, Tokyo (JP)

(72) Inventor: Akihiro Matsumoto, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 16/255,028

(22) Filed: Jan. 23, 2019

(65) Prior Publication Data

US 2019/0235609 A1 Aug. 1, 2019

(30) Foreign Application Priority Data

Jan. 26, 2018 (JP) .............................. JP2018-011850

(51) Int. Cl.
 *G06F 1/3234* (2019.01)
 *G06F 13/16* (2006.01)
 (Continued)

(52) U.S. Cl.
 CPC .......... *G06F 1/3275* (2013.01); *G06F 1/3225* (2013.01); *G06F 1/3284* (2013.01);
 (Continued)

(58) Field of Classification Search
 CPC .... G06F 3/0634; G06F 3/0676; G06F 3/1221; G06F 3/1229; G06F 3/1285;
 (Continued)

(56) References Cited

U.S. PATENT DOCUMENTS

2006/0156035 A1\* 7/2006 Tran ........................ G06F 21/80
 713/193
2009/0083559 A1 3/2009 Matsumoto
 (Continued)

FOREIGN PATENT DOCUMENTS

| EP | 3 273 326 A1 | 1/2018 |
| JP | 2014-178877 A | 9/2014 |
| JP | 2017-059051 A | 3/2017 |

OTHER PUBLICATIONS

Extended Search Report in European Patent Application No. 18 00 1007, dated Jun. 21, 2019.

*Primary Examiner* — Ji H Bae
(74) *Attorney, Agent, or Firm* — Venable LLP

(57) ABSTRACT

An information processing apparatus comprising a first controller, a second controller provided between the first controller and a storage device, and a main controller that sets a power saving state of the first controller, the second controller and the storage device. The first controller transitions to the power saving state in response to a transition request from the main controller, the second controller transitions to the power saving state in response to the power saving state to which the first controller has transitioned, and the first controller starts restoration processing from the power saving state in response to an interrupt from the main controller and determines, based on whether the second controller is performing power control on the storage device, whether to execute preprocessing which is accompanied by access to the storage device.

16 Claims, 20 Drawing Sheets

(51) Int. Cl.
    *G06F 1/3287*     (2019.01)
    *G06F 1/3225*     (2019.01)
    *G06F 3/06*     (2006.01)
    *G06F 3/12*     (2006.01)
    *G06F 21/44*     (2013.01)
    *G06F 21/31*     (2013.01)
    *G06F 1/3203*     (2019.01)
    *G06F 21/70*     (2013.01)

(52) U.S. Cl.
    CPC .......... *G06F 1/3287* (2013.01); *G06F 3/0625* (2013.01); *G06F 3/0634* (2013.01); *G06F 3/0676* (2013.01); *G06F 3/1221* (2013.01); *G06F 3/1229* (2013.01); *G06F 3/1285* (2013.01); *G06F 13/1668* (2013.01); *G06F 1/3203* (2013.01); *G06F 21/31* (2013.01); *G06F 21/44* (2013.01); *G06F 21/70* (2013.01)

(58) Field of Classification Search
    CPC .. G06F 13/1668; G06F 1/3287; G06F 1/3203; G06F 3/0625; G06F 21/31; G06F 21/44; G06F 21/70; G06F 1/3275; G06F 1/3225; G06F 1/3284
    USPC .................................. 713/320, 323; 726/34
    See application file for complete search history.

(56) References Cited

U.S. PATENT DOCUMENTS

2013/0185789 A1\*   7/2013   Hagiwara ............. G06F 21/572
                                                     726/18
2017/0177381 A1\*   6/2017   Altman ................. G06F 9/4416

\* cited by examiner

FIG. 7

| EXTENSION COMMAND NAME (701) | CMD NUMBER (702) | TRANSFER TYPE (703) | DESIGNATION CONTENT |
|---|---|---|---|
| SetupPowerConfig | 01h | PO | FOR EACH POWER SAVING MODE OF PS0/PS1/PS2,<br>·POWER SAVING STATE OF H-Host-IF<br>·POWER SAVING STATE OF B-Host1-IF AND POWER SAVING STATE OF DEVICE MAIN BODY CONNECTED TO B-Host1-IF<br>·POWER SAVING STATE OF B-Host2-IF AND POWER SAVING STATE OF DEVICE MAIN BODY CONNECTED TO B-Host2-IF |
| ToSleep | 02h | ND | NOTIFY UPPER POWER STATUS WILL TRANSITION TO "Sleep" STATE |
| ToDeep | 03h | ND | NOTIFY UPPER POWER STATUS WILL TRANSITION TO "Deep" STATE |
| GetStatus | 04h | PI | OBTAIN SATA BRIDGE CONTROLLER STATUS |
| GetGPIOInfo | 05h | PI | GPIO STATE OBTAINING (INCLUDES OUTA, OUTB, AND IN OF HDD POWER SOURCE CONTROL PORT) |

Row labels: 705, 709, 713, 717, 721

| ATM COMMAND NAME | CMD NUMBER | TRANSFER TYPE | DESIGNATION CONTENT |
|---|---|---|---|
| IDENTIFY DEVICE 805 | ECh | PI | READ OUT DEVICE PARAMETER INFORMATION |
| SECURITY SET PASSWORD 809 | F1h | PO | SET PASSWORD FOR HDD |
| SECURITY UNLOCK 813 | F2h | ND | RELEASE HDD PASSWORD |

801  802  803

APPARATUS, METHOD, AND STORAGE MEDIUM FOR CONTROLLING A POWER SAVING STATE IN A SATA STORAGE SYSTEM

BACKGROUND OF THE INVENTION

Field of the Invention

The present invention relates to an information processing apparatus, a method of controlling the same, and a storage medium.

Description of the Related Art

In recent years, to address environmental problems such as global warming, restrictions related to power saving of individual countries are becoming stricter year by year. Printing apparatuses are not exempt from this trend and are required to actively cope with various kinds of energy related standards. For example, in the case of a hard disk device (to be referred to as an HDD hereinafter) that is incorporated in a printing apparatus, it is preferable to power off the HDD by setting the HDD, including a control unit, in a power saving state when the printing apparatus is not used, regardless of the power state of the printing apparatus.

On the other hand, as simple method of ensuring the security of an HDD, an HDD password lock specified by the SATA (Serial Advanced Technology Attachment) standard is conventionally used in an embedded device. In this method, a lock is placed once the HDD is powered off, and the user area of the HDD cannot be accessed unless the correct password is set to the HDD next time the HDD is powered on. However, this can be inconvenient since a password needs to be set each time the HDD is powered on. As a method of reducing this inconvenience, for example, Japanese Patent Laid-Open No. 2014-178877 proposes a method of reducing the lock cancellation time at the restoration from a power saving state in accordance with a level of importance of the data stored in the HDD. According to this method, if it is determined that the confidentiality of the data stored in the HDD is low, the lock is immediately released, and if it is determined that the confidentiality of the data is high, the lock is released after collation of user.

However, the above-described related art attempts to reduce standby power by powering off the HDD and causing the SATA control system to transition to the power saving state when the HDD is not being used even if the printing apparatus main body itself is in a standby state. Hence, after the SATA control system has transitioned to the power saving state, there is a need to perform control so the SATA control system will not be restored from the power saving state until it is required. Particularly, since there is a limit to the number of times the HDD can be powered on or off, there is a danger that the lifetime of the HDD will be consumed if the number of times the HDD is restored from the power saving state increases.

SUMMARY OF THE INVENTION

An aspect of the present invention is to eliminate the above-mentioned problem with conventional technology.

The feature of the present invention is to provide a technique that can efficiently reduce power consumption while considering the lifetime of a storage device connected to an interface complying with the SATA standard.

According to a first aspect of the present invention, there is provided an information processing apparatus comprising: a first controller that includes an interface in compliance with a SATA (Serial Advance Technology Attachment) standard; a second controller provided between the first controller and a storage device and including an interface in compliance with the SATA standard; a main controller that sets a power saving state of the first controller, a power saving state of the second controller, and a power saving state of the storage device in association with a power state that the information processing apparatus may be set; and a power controller controlled by the second controller and configured to control the power supply to at least the main controller, the first controller, the second controller, and the storage device, wherein the first controller transitions to the power saving state in accordance with the setting in response to a transition request from the main controller, the second controller transitions to the power saving state in accordance with the setting in response to the power saving state to which the first controller has transitioned, and the first controller starts restoration processing from the power saving state in response to an interrupt from the main controller and determines, based on whether the second controller is performing power control on the storage device, whether to execute preprocessing which is accompanied by access to the storage device.

According to a second aspect of the present invention, there is provided a method of controlling an information processing apparatus that includes a first controller that includes an interface in compliance with a SATA (Serial Advance Technology Attachment) standard, a second controller provided between the first controller and a storage device and includes an interface in compliance with the SATA standard, a main controller configured to set a power saving state of the first controller, a power saving state of the second controller, and a power saving state of the storage device in association with a power state that the information processing apparatus may be set, and a power controller controlled by the second controller and configured to control the power supply to at least the main controller, the first controller, the second controller, and the storage device, the method comprising: transitioning the first controller to the power saving state in accordance with the setting in response to a transition request from the main controller; transitioning the second controller to the power saving state in accordance with the setting in response to the power saving state to which the first controller has transitioned, and causing the first controller to start restoration processing from the power saving state in response to an interrupt from the main controller and determining, based on whether the second controller is performing power control on the storage device, whether to cause the first controller to execute preprocessing which is accompanied by access to the storage device.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 depicts a view illustrating an example of a table for explaining extension commands for setting the power saving transition conditions described in FIG. 6 to the SATA bridge controller in advance;

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that, in each embodiment to be described below, an embodiment of an information processing apparatus according to the present invention will be described by using an example of a printing apparatus. However, the information processing apparatus is not limited to the printing apparatus but is applicable to a device that uses an HDD/SSD such as, for example, a personal computer (PC), a communication apparatus, a mobile terminal, and the like.

Figure 1:
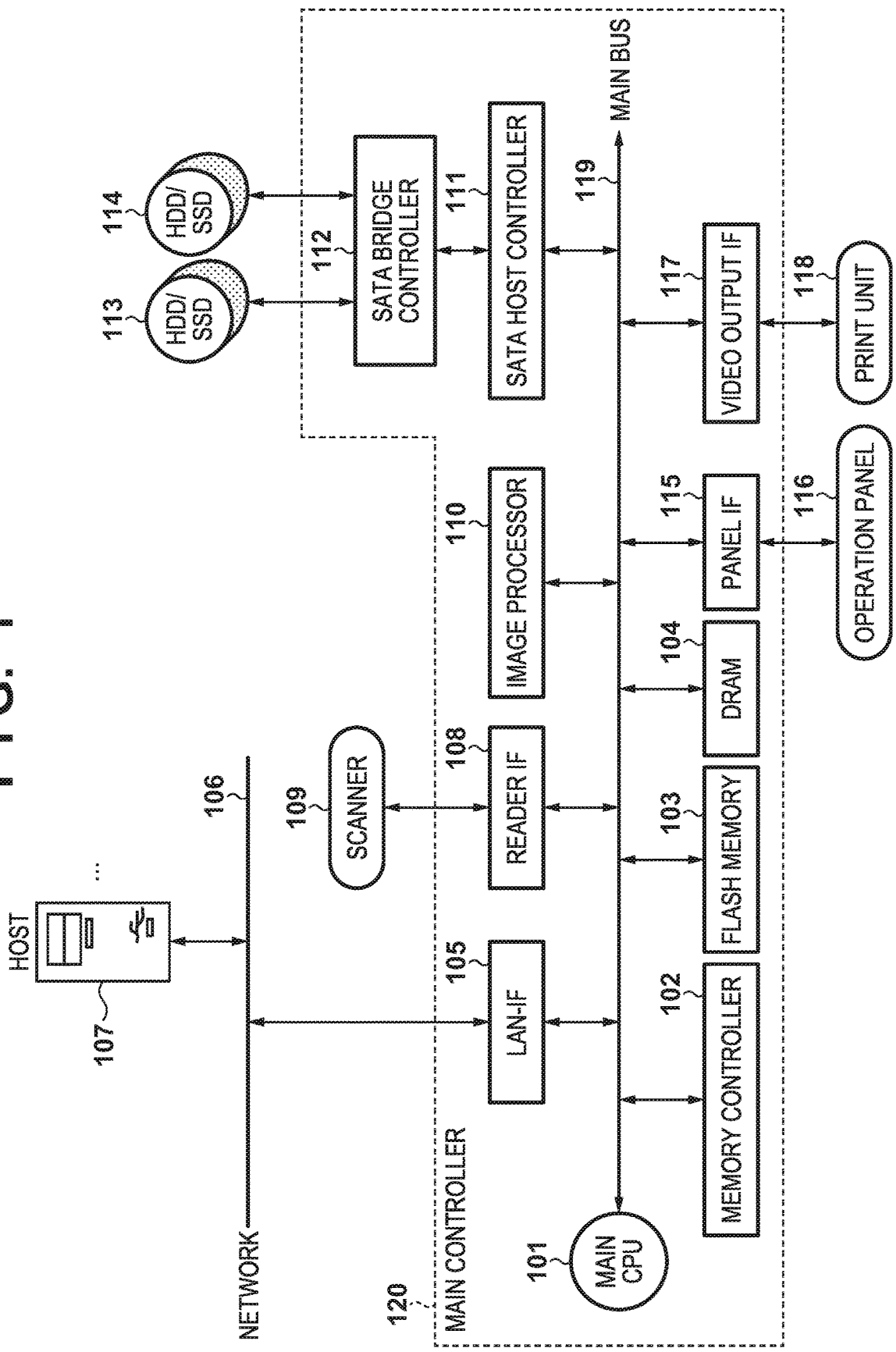
FIG. 1 is a block diagram for explaining a printing apparatus and a system arrangement including the printing apparatus according to an embodiment.

FIG. 1 is a block diagram for explaining a printing apparatus and a system arrangement including the printing apparatus according to an embodiment.

This printing apparatus includes a main controller 120, a scanner 109, an operation panel 116, a print unit (printer engine) 118, and HDDs or SSDs (Solid State Drives) 113 and 114.

A main CPU 101 performs system control and various kinds of arithmetic processing. A memory controller 102 controls input/output to/from various kinds of memory devices and executes DMA (direct memory access) control. A flash memory 103 is a rewritable nonvolatile memory and stores control programs and control parameters of the overall system. A DRAM 104 is a volatile rewritable dedicated memory represented by a DDR (Double-Data-Rate) memory. The DRAM 104 is used for purposes such as a program deployment area, a work area, a print data storage area, a storage area for various kinds of table information, and the like. The relationship between the memory controller 102 and the various kinds of memory devices has been simplified for the sake of descriptive convenience here, and generally the memory devices are controlled independently. A LAN-IF (network interface) 105 controls the input/output to/from a local area network (LAN) 106 that is connected to the printing apparatus. In general, the LAN-IF supports TCP/IP (Transmission Control Protocol/Internet Protocol). The LAN-IF 105 is connected, via a network cable, to a network supporting device such as an external computer 107 and is capable of executing printing via a network.

A reader IF 108 connects the scanner 109 and the main controller 120 to each other and performs communication control between them. A copy function can be implemented by causing the scanner 109 to obtain image data by reading an original and causing the print unit 118 to print the obtained image data. An image processor 110 performs various kinds of image processing on image data input via the LAN-IF 105 and the reader IF 108.

A SATA host controller 111 controls the input/output of data to/from a device that includes in interface in compliance with the SATA standard. An SATA bridge controller 112 is connected as a device to the SATA host controller 111 on the upstream side, includes a plurality of Host IFs 207 and 208 (FIG. 2) on the downstream side, and is connected to the HDDs or SSDs (to be simply referred to as HDDs hereinafter) 113 and 114. The SATA bridge controller 112 incorporates value-added functions such as RAID (Redundant Arrays of Inexpensive Disk) control, data encryption, and the like.

In the embodiment, a description of the SATA host controller 111 on the upper side and the SATA bridge controller 112 on the lower side will be given assuming that each of these controllers is incorporated in the main controller 120 as an independent ASIC (application specific integrated circuit). A panel IF 115 executes communication control with the operation panel 116 that has a touch panel function. Although it is not shown in FIG. 1, the various settings and states of the printing apparatus can be confirmed by operating a screen, buttons, and the like of the operation panel 116 as a UI (user interface). A video output IF 117 executes command/status communication control with the print unit 118 and transfers print data. Although it is not shown in FIG. 1, the print unit 118 includes mechanisms for a sheet feeding system and a sheet discharging system, and prints an image on a sheet in accordance with the command information from mainly the video output IF 117. A main bus 119 includes a bus controller, and is a component in which a control bus, a data bus, and a local bus arranged between arbitrary blocks have been summarized for the sake of descriptive convenience. As a representative example, internal buses for a PCIe and an ASIC are also included.

Figure 2:
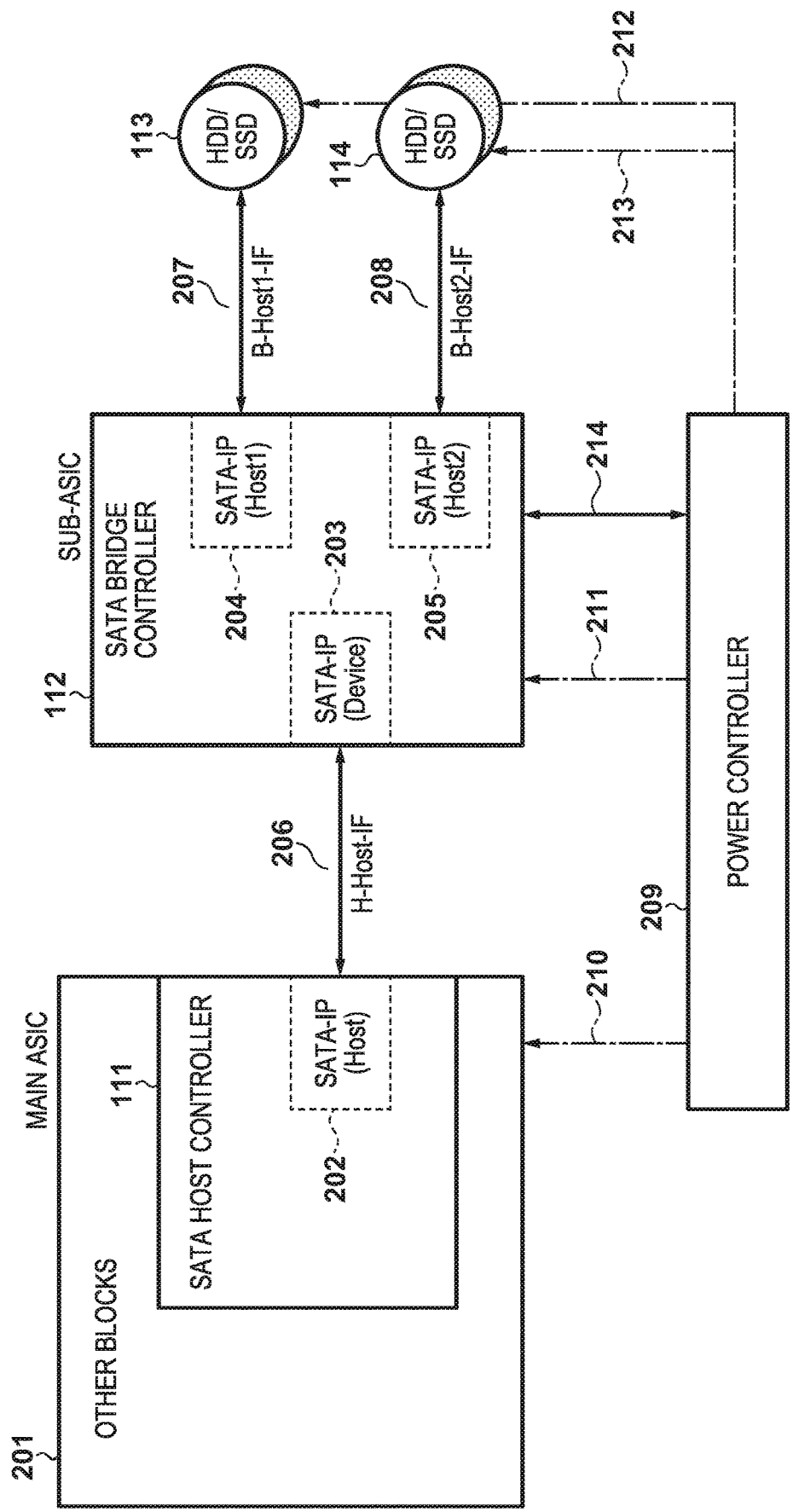
FIG. 2 is a block diagram for explaining the arrangement of a SATA control system.

FIG. 2 is a block diagram for explaining the arrangement of a SATA control system.

A main ASIC 201 is a central ASIC that controls the overall system of the main controller 120 which includes the SATA host controller 111. The SATA host controller 111 holds one SATA-IP (Intellectual Property) 202 as a host IF. A sub-ASIC is the SATA bridge controller 112 which is connected to the lower side of the SATA host controller 111, and the sub-ASIC is mounted as an IC (Integrated Circuit) independent of the main controller 120.

The SATA bridge controller 112 includes three SATA-IPs 203 to 205, and intervenes between the HDD 113 as a device and the SATA host controller 111. On the upstream side of the bridge arrangement, the SATA-IP (Host) 202 and the SATA-IP (Device) 203 are connected to each other via an H-Host-IF 206. Also, on the downstream side, the SATA-IP (Host1) 204 is connected to the HDD 113 via the B-Host1-IF 207, and the SATA-IP (Host2) 205 is connected to the HDD 114 via the B-Host2-IF 208. The SATA-IPs 202 to 205 here are each formed from a SATA link layer and a physical layer. Each SATA-IP issues physical SATA standard commands to and receives statuses from a corresponding SATA device to which it is connected via the SATA-IFs 206 to 208 in accordance with the various kinds of SATA register settings.

The SATA bridge controller 112 is connected to a power controller 209 by a control signal 214. The power controller 209 is mounted on a mainboard that incorporates the main controller 120. The power controller 209 is in charge of power control of the overall printing apparatus by determining the presence/absence of power supply to the various function modules included in the main controller 120 and the various kinds of devices connected to the modules. Alternate long and short dashed lines 210 to 213 originating from the power controller 209 indicate power supply lines that supply power to the components of the SATA host bridge portion.

Note that although the embodiment will describe an example in which there is one IF between the SATA host controller 111 and the SATA bridge controller 112 and there are two IFs between the SATA bridge controller 112 and the HDDs 113 and 114, these components may have an arbitrary number of connection forms.

Figure 3:
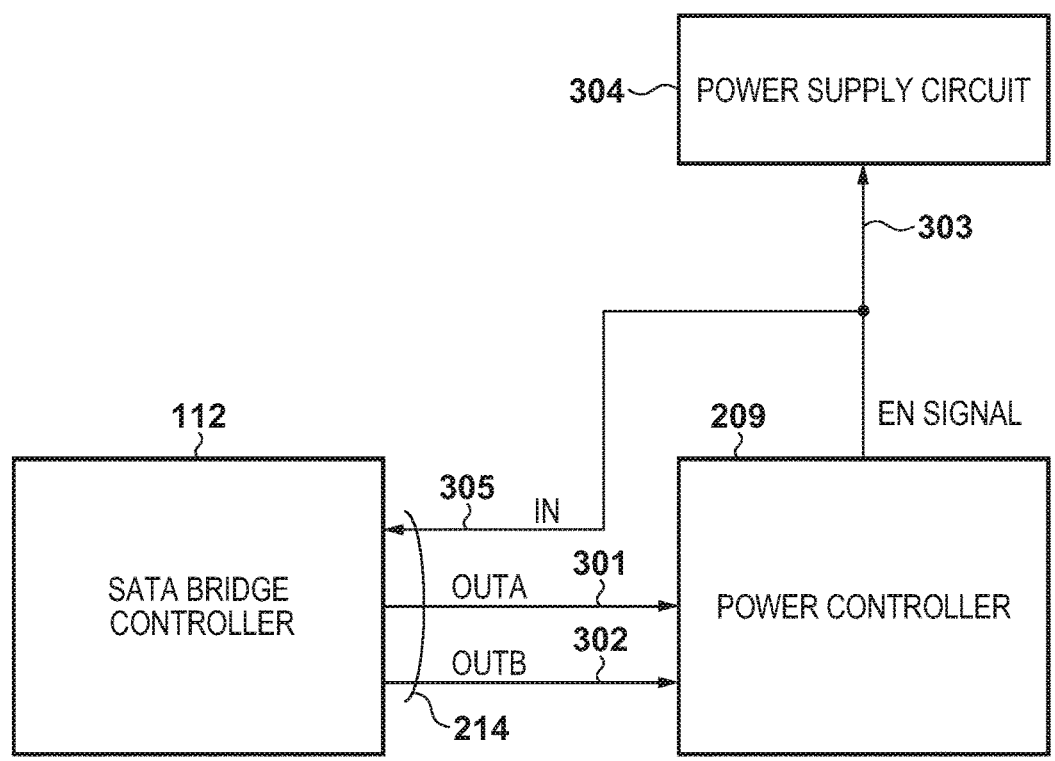
FIG. 3 is a block diagram for explaining, in more detail, control signals for performing HDD power control between an SATA bridge controller and a power controller according to the embodiment.

FIG. 3 is a block diagram for explaining, in more specific detail, the control signal 214 for performing HDD power control between the SATA bridge controller 112 and the power controller 209.

A control signal IN 305 is an input signal to the SATA bridge controller 112, and control signals OUTA 301 and OUTB 302 are output signals output from the SATA bridge controller 112 to the power controller 209. An EN signal 303 for controlling the power supply is output from the power controller 209 to a power supply circuit 304 that supplies power to the HDDs 113 and 114. Although it is not shown here, a DC-DC power supply (direct current input to direct current output power supply), an FET (field-effect transistor), and the like are examples of the power supply circuit 304. The EN signal 303 is connected to the IN 305, and the IN 305 is input to the SATA bridge controller 112 as a monitoring signal for determining whether the power is on or off, that is, as a signal for determining the state of power supply to each of the HDDs 113 and 114. The OUTA 301 and the OUTB 302 are requesting signals for requesting the power controller 209 to power on/off the HDDs 113 and 114.

Figure 4:
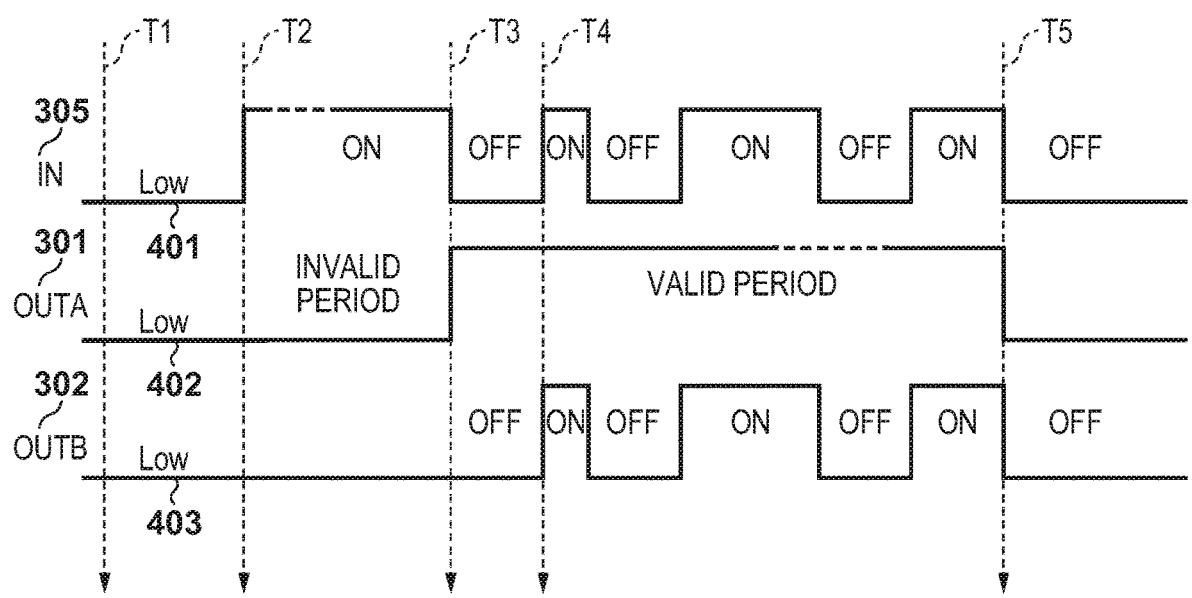
FIG. 4 is a timing chart of control signals IN, OUTA, and OUTB according to the embodiment.

FIG. 4 is a timing chart of the control signals IN 305, OUTA 301, and OUTB 302 according to the embodiment.

Assume that the processing of all of the signals shown here will start from low level (Low) at the starting point of T1. The IN 305 is a monitoring signal indicating the power-off state or the power-on state of the HDDs 113 and 114, and indicates, after activation, that the HDDs 113 and 114 have been powered on at the point of T2. The OUTA 301 is a signal indicating a valid period in which a request to power off or power on the HDDs 113 and 114 is transmitted to the power controller 209. A period in which this signal 301 is at high level, that is, a period from T3 to T5 is a period in which a request to turn off or on the power supply to each of the HDDs 113 and 114 is transmitted to the power controller 209. The OUTB 302 is a signal to request to turn off or on the power to be supplied to the HDDs 113 and 114. An on request is indicated when the OUTB 302 is at high level, and an off request is indicated when the OUTB is at low level. In the example of FIG. 4, at the starting point of T3, the power supply to the HDDs 113 and 114 is set to the off state since the OUTA is at high level and the OUTB is at low level, and this period is a period until the OUTB is changed to high level at T4. It can be understood from a period from T3 to T4 that the IN, which is the monitoring signal, is at low level and that the power supply to the HDDs 113 and 114 is set to the off state. In the same manner, it can be understood that in a valid period in which the OUTA is at high level, the IN 305 changes similarly from high level to low level in accordance with the result in which the OUTB 302 is changed from high level to low level.

Note that in the example described with reference to FIGS. 3 and 4, the relationship between the IN 305 which is the monitoring signal and the OUTB 302 which is the power on/off request signal has a one-to-one correspondence. However, the present invention is not limited to this. For example, each device may be controlled by setting a monitoring signal (EN signal): INn and a power off/on request signal: OUTBn (n≥2) in correspondence with a number n of the plurality of storage devices which are to be connected to the SATA bridge controller 112.

Figure 5:
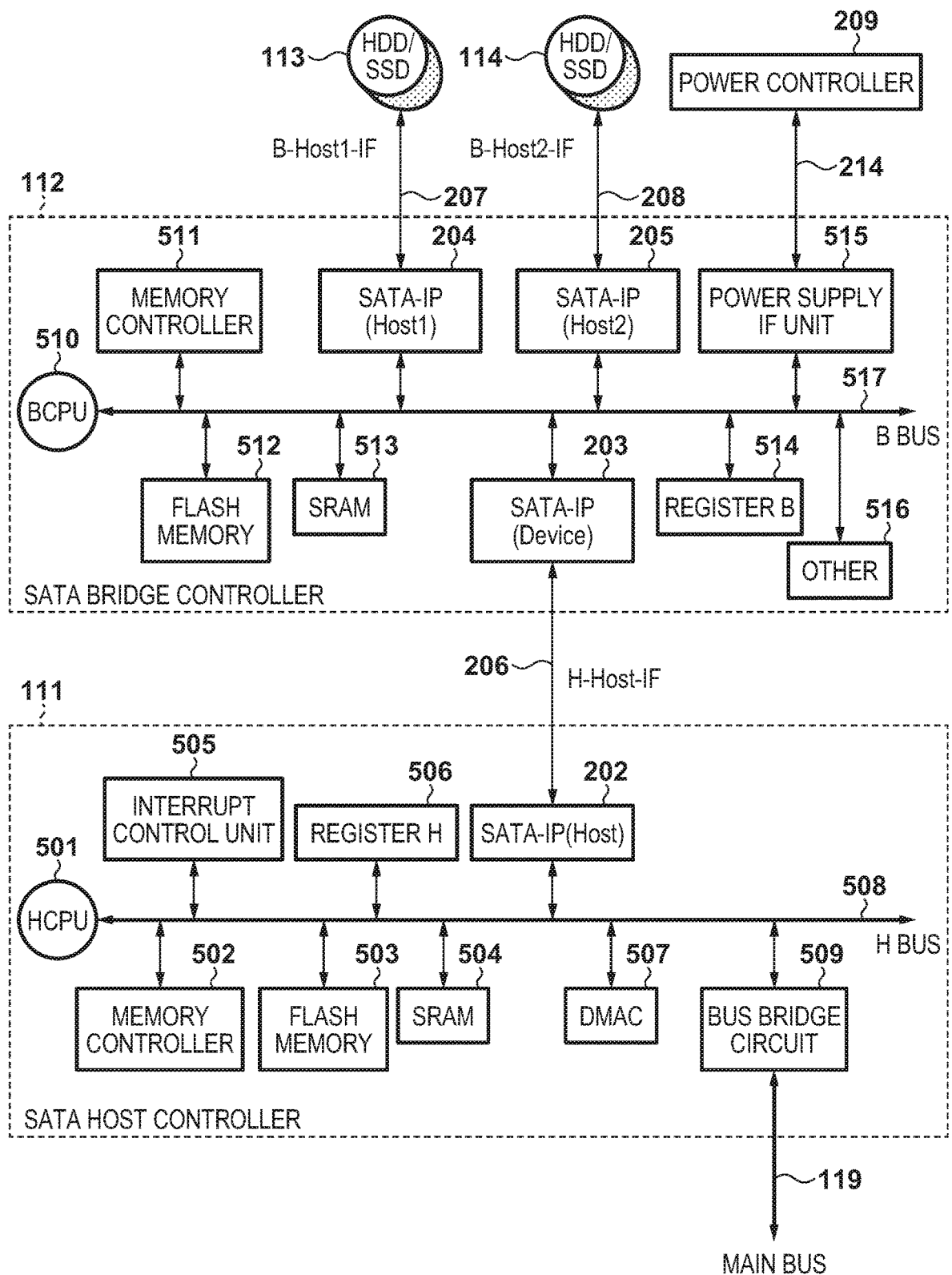
FIG. 5 is a block diagram for explaining an example of the internal arrangements of a SATA host controller and the SATA bridge controller according to the embodiment.

FIG. 5 is a block diagram for explaining an example of the internal arrangement of the SATA host controller 111 and the SATA bridge controller 112 according to the embodiment. Note that in FIG. 5, the same reference numbers are used to denote parts in common with the FIGS. 1 and 2 described above.

The arrangement of the SATA host controller 111 will be described first. A CPU (HCPU) 501 of the SATA host controller 111 is a CPU that performs general control as a SATA controller such as SATA command issuing processing, transmission/reception data transfer processing, status reception processing, and the like. A memory controller 502 performs input/output control to/from a flash memory 503 and a SRAM (static random access memory) 504. The flash memory 503 stores a boot program and a control program that serves as a SATA controller. The SRAM 504 is used as a work area of the HCPU 501, a storage area of various kinds of control tables and parameters, a data buffer, and the like. The SRAM 504 is described as a simplification of the control of a first port RAM, a second port RAM, a FIFO (first-in first-out) memory, and the like, and SRAMs independently controlled may be present in a plurality of locations. An interrupt control unit 505 performs input/output processing of interrupt signals to the HCPU 501, mask processing on an interrupt signal, and the like. A register H 506 is a register for temporarily storing control parameters related to power saving and the like. Although it is not shown here, a DMAC 507 performs DMA data transfer between predetermined memories upon activation after a transfer source, the start address of a transfer destination, and a size are set to a predetermined register by the HCPU 501. An H bus 508 includes a bus controller, and is a component in which a control bus, a data bus, and a local bus between arbitrary blocks have been summarized for the sake of descriptive convenience. A bus bridge circuit 509 is a bus bridge circuit that converts the bus protocols between the main bus 119 and the H bus 508.

The arrangement of the SATA bridge controller 112 will be described next. A CPU (BCPU) 510 of the SATA bridge controller 112 is a CPU that performs general control, as a SATA controller, such as SATA command issuing processing, transmission/reception data transfer processing, status reception processing, and the like. A memory controller 511 performs input/output control to/from a flash memory 512 and a SRAM 513. The flash memory 512 stores a boot program and a control program that serves as a SATA controller. The SRAM 513 is used as a work area of the BCPU 510, a storage area of various kinds of control tables and parameters, a data buffer, and the like. The SRAM 513 is described as a simplification of the control of a one-port RAM, a two-port RAM, a FIFO (first-in first-out) memory, and the like, and SRAMs may be independently controlled and be present in a plurality of locations. A register B 514 is a register for temporarily storing control parameters related to power saving and the like. A power supply IF 515 is connected to the power controller 209 by the control signal 214 and controls the power off/on request signals to the HDDs 113 and 114. Although other 516 is a component in which other functional blocks, for example, RAID processing, data encryption processing, and the like of the SATA bridge controller 112 have been summarized for the sake of descriptive convenience, a description will be omitted since it is irrelevant to the present invention. B bus 517 includes a bus controller, and is a component in which a control bus, a data bus, and a local bus between arbitrary blocks have been summarized for the sake of descriptive convenience. Also, as described in FIG. 2, the SATA-IP (Host) 202 of the SATA host controller 111 and the SATA-IP (Device) 203 of the SATA bridge controller 112 are connected to each other via the H-Host-IF 206. In addition, the SATA-IPs (Host1 and Host2) 204 and 205 are connected to the HDDs 113 and 114 via the B-Host1-IF 207 and the B-Host2-IF 208, respectively.

Figure 6:
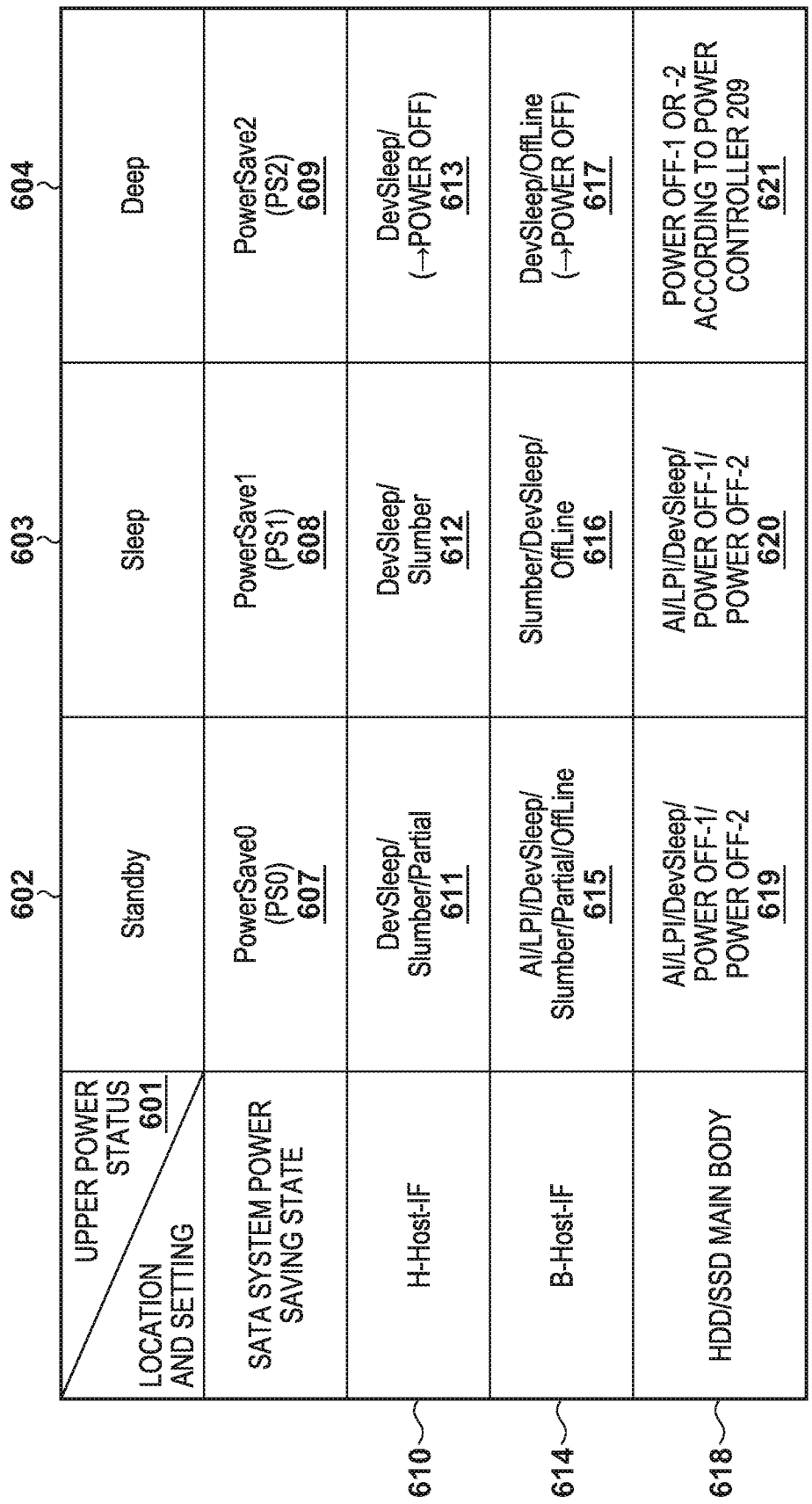
FIG. 6 depicts a view illustrating an example of a table in which power states of a main controller are shown on the abscissa axis and power saving states and power saving transition conditions of the SATA control system are shown on the ordinate axis according to the embodiment.

FIG. 6 depicts a view illustrating an example of a table showing power states of the main controller 120 are shown on the abscissa axis and power saving states and power saving transition conditions of the SATA control system are shown on the ordinate axis according to the embodiment.

The first row shows an upper power status 601 of the overall printing apparatus, and the power statuses are defined in a descending order of power consumption as a Standby mode 602, a Sleep mode 603, and a Deep mode 604. The Standby mode 602 is a standby state in which the printing apparatus can immediately accept and execute a job. In this state, the main controller 120, the scanner 109, operation panel 116, the print unit 118, and the HDDs 113 and 114 are all energized and are basically in an idle state. The Sleep mode 603 and the Deep mode 604 are set for the purpose of reducing standby power in a period in which the printing apparatus is set in a power saving state and is not executing a job. In the Sleep mode 603, the components described in the Standby mode 602 are energized, but are basically set in a sleep state which is a power saving state. The Deep mode 604 is a state in which power supply to most of the components has been cut and only the memory controller 102, the DRAM 104, the LAN-IF 105, the panel IF 115, and the operation panel 116 are energized. This Deep mode 604 is a state in which the units that have been set in the power saving state in the Sleep mode 603 are set to a power saving state in which the power consumption is further reduced, and power supply to units other than these has been set to the off state. In the Deep mode 604, it is assumed that the SATA host controller 111, the SATA bridge controller 112, and the HDDs 113 and 114 which are the connected devices are all set to the power-off state.

In order to further cope with next-generation SATA power saving control, a PowerSave0 (PS0) 607, a PowerSave1 (PS1) 608, and a PowerSave2 (PS2) 609 are defined as SATA power saving states corresponding to the upper power status 601. The PS0 (607) to the PS2 (609) correspond to the upper power statuses as shown in FIG. 6, and have a relationship expressed as PS0<PS1<PS2 (power off) in terms of power reduction effect. Also, as a tradeoff, in the restore time period, the inequalities in this relationship are reversed. That is, the power saving state PS2 will have the longest restore time period, and power saving state PS0 will have the shortest restore time period.

For the respective SATA power saving states, transition conditions to the power saving states of the H-Host-IF 206 are defined by items 611 to 613, transition conditions to the power saving states of the B-Host1-IF 207 and the B-Host2-IF 208 are defined by items 615 to 617, and the transition conditions to the power saving states of each HDD main body are defined by items 619 to 621. Contents divided by "/" in the setting values of each of the items 611 to 613, the items 615 to 617, and the items 619 to 621 indicate that one setting value among the contents will be set. However, the number of setting values (that is the number of possible states) may be added arbitrarily.

Parts corresponding to an H-Host-IF state 610, a B-Host-IF state 614, and an HDD main body state 618 as the power saving setting values of FIG. 6 will be described with reference to FIG. 2. These parts correspond to the H-Host-IF 206 (including the SATA-IP 202 and the SATA-IP 203), the B-Host1-IF 207 and the B-Host2-IF 208 (including the SATA-IP 204 and the SATA-IP 205), and the HDDs 113 and 114, respectively. This represents that the corresponding parts will be set to the states of the setting values of the items 611 to 613, the items 615 to 617, and the items 619 to 621 in a case in which a transition to the states of the PS0 (607) to the PS2 (609) occurs.

Power saving states that can be set as the power saving transition conditions will be described next.

Power saving states which are AI: Active-Idle and LPI: Low-Power-Idle and are defined by the ATA standard between an SATA-IF and a connected device main body in the idle state will be shown. As already described, Partial/Slumber is a state defining the power saving state of each SATA-IF in compliance with the SATA standard, and DevSleep is a state defining the power saving states of the SATA-IFs and the device main body in compliance with the SATA standard. Also, OffLine indicates an invalid (stopped) state of the SATA-IP. In general, when the states are arranged in a descending order from the state with the highest power saving effect for each SATA-IF, they are arranged as OffLine>DevSleep>Slumber>Partial>LPI>AI. In the same manner, the power saving states of the device main body are arranged as power off>DevSleep>LPI>AI.

Here, in the power-off instruction setting conditions of each device to be connected, a power off-1 and a power off-2 will be set to the items 619 and 620, and the following definitions will be provided. The power off-1 is a setting in which the powering on of the device main body is not performed at the time of the next restoration operation (power saving and lifetime priority). The power off-2 is a setting in which the powering on of the device main body will also be performed simultaneously at the time of the next restoration operation (convenience priority). The power off-1 and the power off-2 allow power saving control to be performed, particularly, in consideration of the power OFF/ON lifetime of the HDD. Although this will be described later with reference to the drawings, these power saving transition conditions will be set in advance at the time of the activation of the SATA host controller 111 and the SATA bridge controller 112.

In general, the optimal solution for the power saving effect of the HCPU system of the SATA host controller 111 and that of the BCPU system of the SATA bridge controller 112 is to set the same relationship as PS0<PS1<PS2 (power off) as the tradeoff with the restore time. However, it may be the relationship of PS0≤PS1<PS2. As a power saving method of the HCPU 501 and the BCPU 510 themselves, although it is not shown here, there is a method in which the power supply is partially cut by a clock gate or by power supply separation. Also, there is no setting value for the HDD in the Deep mode 604, and the powering on or off of the HDD at the time of restoration depends on the power controller 209. In this case as well, in the same manner as the cases of the PS0 (607) and the PS1 (608), it is shown that both the power off-1, which is a setting accompanied by the powering on of the HDDs, and the power off-2, which is a setting not accompanied by the powering on of the HDDs, are included at the time of the restoration from the Deep mode to the Sleep mode.

Note that although there are three stages of power states of the overall printing apparatus and three stages of corresponding SATA system power saving states in the example described in FIG. 6, the number of power saving states and the number of SATA system power saving states can be set arbitrarily. In addition, the items 615 to 617 indicating the power saving transition conditions of the B-Host1-IF 207 and the B-Host2-IF 208 and the items 619 to 621 indicating the power saving transition conditions of the HDD main body may be set separately on a connection port basis.

FIG. 7 depicts a view illustrating an example of a table for explaining extension commands for setting the power saving transition conditions described in FIG. 6 to the SATA bridge controller 112 in advance.

With respect to a vendor unique command (for example, F0h) which is a null command defined in compliance with the SATA standard, a power saving system extension command is uniquely defined, as indicated from the left in the first row of FIG. 7, as an extension command name 701, a CMD (subcommand) number 702, and a transfer type 703 are uniquely defined as power saving system extension commands. In this case, the CMD number 702 indicates a subcommand number which is set to a feature register of a vendor unique command (for example, F0h). Also, in the SATA standard, transfer types such as Non-Data (ND) transfer which does not include data, PIO-In (PI) or PIO-Out (PO) transfer for executing a one-time data transfer, and a DMA transfer for executing continuous data transfers are defined as basic transfer types. The transfer type 703 of FIG. 7 defines the transfer types with respect to the CMD (subcommand) number 702. For example, a SetupPowerConfig command 705 includes a CMD number "01h" and a transfer type "PO". In the same manner, a ToSleep command 709 includes a CMD number "02h" and a transfer type "ND", and a ToDeep command 713 includes a CMD number "03h" and a transfer type "ND". In addition, a CMD number "04h" and transfer type "PI" are defined for a GetStatus command 717.

The SetupPowerConfig command 705 is used to set, to the SATA bridge controller 112, the items 611 to 613 of power saving transition conditions of the H-Host-IF 206, the items 615 to 617 of power saving transition conditions of B-Host1-IF 207 and the B-Host2-IF 208, and the items 619 to 621 of power saving transition conditions of the HDD main body.

The ToSleep command 709 is a command to notify the SATA bridge controller 112 that the upper power status will transition to the Sleep mode 603. In the same manner, the ToDeep command 713 is a command to notify the SATA bridge controller 112 that the upper power status will transition to the Deep mode. The GetStatus command 717 is an extension command for obtaining the general status of the SATA bridge controller 112. Although this command is not an extension command directly related to power saving, it is used when, for example, the upper system is to obtain information that the power saving transition processing has been completed. A GetGPIOInfo command 721 is a command for obtaining the state of GPIO (General Purpose Input/Output) held by the SATA bridge controller 112, including the control ports for the IN, the OUTA, and the OUTB which are the control signals between the SATA bridge controller 112 and the power controller 209.

Note that the internal definitions of the extension commands described above are irrelevant to the present invention, and a description thereof will be omitted. In a case in which a command defined in compliance with the ATA standard that is other than an extension command is to be discriminated and described, such a command will be referred to as an ATA command hereinafter.

Figures 8, 9:
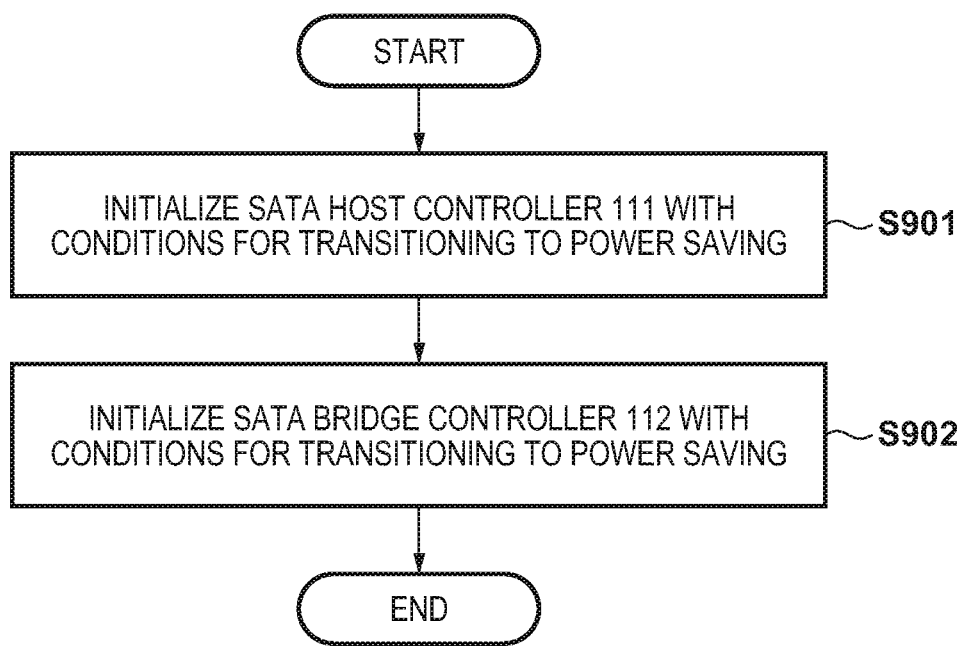
FIG. 8 depicts a view illustrating an example of a table for explaining an example of ATA commands according to the embodiment.
FIG. 9 is a flowchart for describing the initial settings of the power saving control performed on the SATA host controller and the SATA bridge controller according to the embodiment.

FIG. 8 depicts a view illustrating an example of a table for explaining an example of an ATA command according to the embodiment.

A CMD number 802 and a transfer type 803 indicate actual numbers used in the ATA standard. An IDENTIFY DEVICE command 805 is a command for reading out various kinds of parameters of a device. Information such as the serial number, the capacity, the security status (password lock), and the like of the device can be obtained by this command. A SECURITY SET PASSWORD command 809 is a command for setting a password to a target device (HDD). When the target device is powered off, the target device is set to a password locked state, and the user area cannot be accessed unless this lock is released at the time of the next activation. A SECURITY UNLOCK command 813 is transmitted to the target device to release the lock set by a password. As a result, it becomes possible to execute read/write processing in the user area.

Control related to the embodiment will be described further with reference to several flowcharts. Note that for the sake of descriptive convenience, a description concerning error processing which is irrelevant to the present invention will be basically omitted. Note that in the following description, if there is no need to particularly discriminate between the HDDs, the HDDs 113 and 114 will be simply referred to as the HDDs.

FIG. 9 is a flowchart for describing the initial settings of power saving control of the SATA host controller 111 and the SATA bridge controller 112 according to the embodiment. Note that the processing shown in this flowchart is implemented by the main CPU 101 deploying a program stored in the flash memory 103 to the DRAM 104 and executing the deployed program.

First, in step S901, the main CPU 101 sets, to the SATA host controller 111 at the time of the activation (cold boot) of the main controller 120, the transition conditions (the items 611 to 613) to the power saving states PS0 to PS2 of the H-Host-IF 206 described in FIG. 6. Next, when the process advances to the next step S902, the main CPU 101 sets, to the SATA bridge controller 112, the power saving transition conditions (the items 615 to 617) of the B-Host1-IF 207 and the B-Host2-IF 208 and the power saving transition conditions (items 619 to 621) of the HDD main body described in FIG. 6. At this time, the main CPU 101 causes the SATA host controller 111 to issue the SetupPowerConfig command 705 and sets the issued command to the SATA bridge controller 112.

Upon receiving this SetupPowerConfig command 705, the BCPU 510 of the SATA bridge controller 112 stores the power saving transition conditions in a predetermined location. The storage location of the power saving transition conditions of the SATA host controller 111 and the SATA bridge controller 112 here can be the register H 506, the register B 514, the SRAMs 504 and 513, the flash memories 503 and 512, and the like. Note that the storage location is not particularly limited as long as it is a storage location from which the settings can be read out at the time of the power saving transition processing. In addition, although the initial setting at the time of activation of the main controller 120 has been described above, as long as the printing apparatus is in the Standby mode 602, the power saving transition conditions can be reset at an arbitrary timing by using the same setting method.

Note that at the time of the activation (cold boot) of the printing apparatus according to the embodiment, it is assumed that the upper power status will transition to the Standby mode and that the SATA control system and each storage device connected to it will transition to the idle state. In addition, at the initial setting before the operation of the printing apparatus is started, the password lock function of each HDD has been validated by the SECURITY SET PASSWORD command 809 shown in FIG. 8. Also, a description will be given assuming that there is a need to release the lock by transmitting a password by using the SECURITY UNLOCK command 813 before the user area of each HDD is to be accessed after the HDD power off→on.

Figure 10:
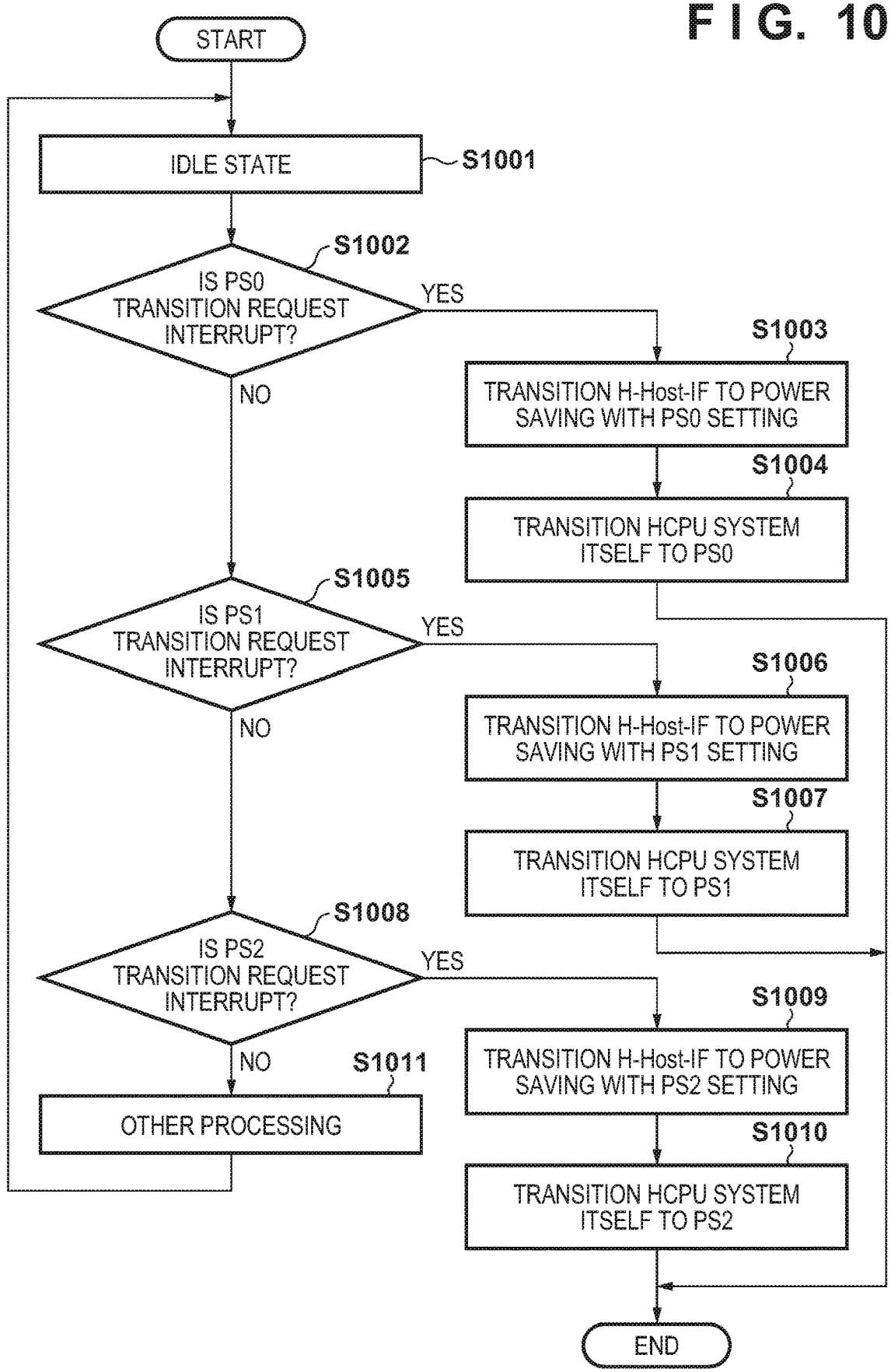
FIG. 10 is a flowchart for describing processing which is performed when the SATA host controller transitions to a power saving state according to the embodiment.

FIG. 10 is a flowchart for describing processing performed when the SATA host controller 111 transitions to the power saving state according to the embodiment. Note that the processing shown in this flowchart is implemented by the HCPU 501 deploying a program stored in the flash memory 503 to the SRAM 504 and executing the deployed program.

First, in step S1001, the HCPU 501 stands by for an interrupt from the main CPU 101 in an idle (standby) state. The process advances to step S1002 when an interrupt signal is received, and the HCPU 501 determines the interrupt signal. In step S1002, after the HCPU 501 determines that the interrupt signal is an interrupt requesting a transition to the PS0, the process advances to step S1003. In step S1003, the HCPU 501 executes transition processing to transition the H-Host-IF 206 to the PS0 set in advance (FIG. 6). The process then advances to step S1004, the HCPU 501 transitions to the power saving state by changing the system itself of the HCPU 501 to the PS0, and completes the transition processing.

On the other hand, if the interrupt requesting the transition to the PS0 cannot be performed in step S1002, the process advances to step S1005, and the HCPU 501 determines whether the interrupt is an interrupt requesting a transition to the PS1. If it is determined that the interrupt is a transition request interrupt to the PS1, the process advances to step S1006. In step S1006, the HCPU 501 causes the H-Host-IF 206 to transition to the power saving state according to the PS1 (FIG. 6) set in advance. The process subsequently advances to step S1007, the HCPU 501 transitions to the power saving state by changing the system itself of the HCPU 501 to the state of the PS1, and completes the transition processing.

Also, if the interrupt is not a transition request interrupt to the PS1 in step S1005, the process advances to step S1008, and the HCPU 501 determines whether the interrupt is a transition request interrupt to the PS2. If it is determined that the interrupt is a transition request interrupt to the PS2, the process advances to step S1009. In step S1009, the HCPU 501 causes the H-Host-IF 206 to transition to the power saving state according to the PS2 (FIG. 6) which was set in advance. The process then advances to step S1010, and the HCPU 501 transitions to the power saving state by changing the system itself of the HCPU 501 to the power saving state of the PS2, and completes the transition processing. Also, in step S1008, if it is determined that the interrupt is not a transition request interrupt to the PS2, the process advances to step S1011. In step S1011, the HCPU 501 executes processing corresponding to an interrupt other than the power saving state transition request interrupt, for example, write/command issuance processing at the time of normal data transfer. Subsequently, after this processing is completed, the process returns again to step S1001, and HCPU is set to the idle state. Note that although it is not shown in FIG. 10, after transitioning to the requested power saving state, the HCPU 501 simultaneously notifies the main CPU 101 of the transition completion interrupt and reports a part of the register H 506 as status register of a power saving state.

Some of the power saving transition conditions of the H-Host-IF 206 set in the PS0 to the PS2 will be described here. Partial and Slumber are conditions to set a power saving state with respect to each SATA-IF by transmitting a request packet defined according to the SATA standard and if the request is permitted by the transmission destination. DevSleep is a condition that can reduce the power consumption of the connected device itself by causing each SATA-IF to be set to Slumber, and, in addition, setting a DEVSLP signal which is a single-end signal to the enable state.

Figure 11A:
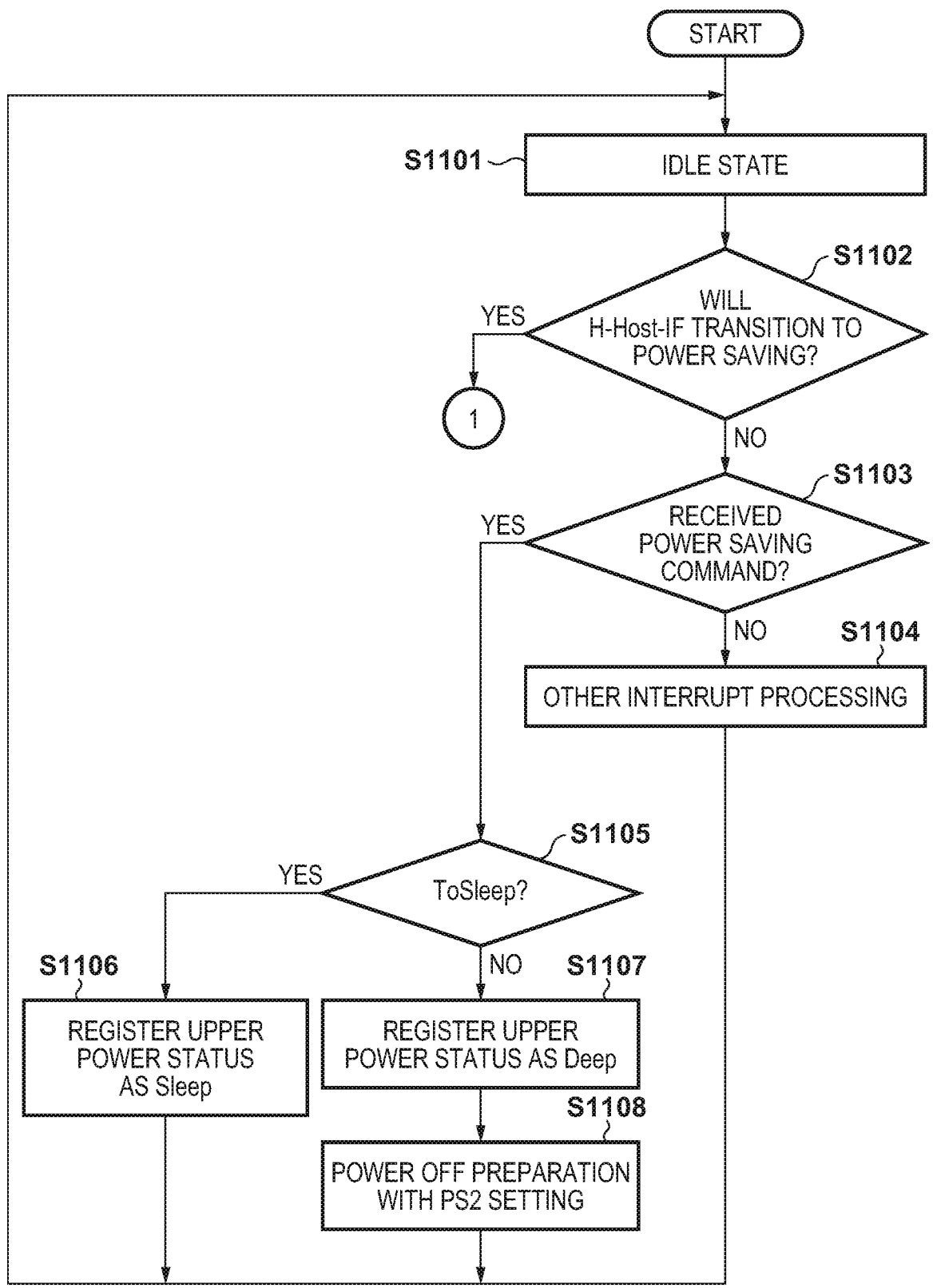
FIGS. 11A and 11B are flowcharts for describing processing which is performed when the SATA bridge controller transitions to the power saving state according to the embodiment.
Figure 11B:
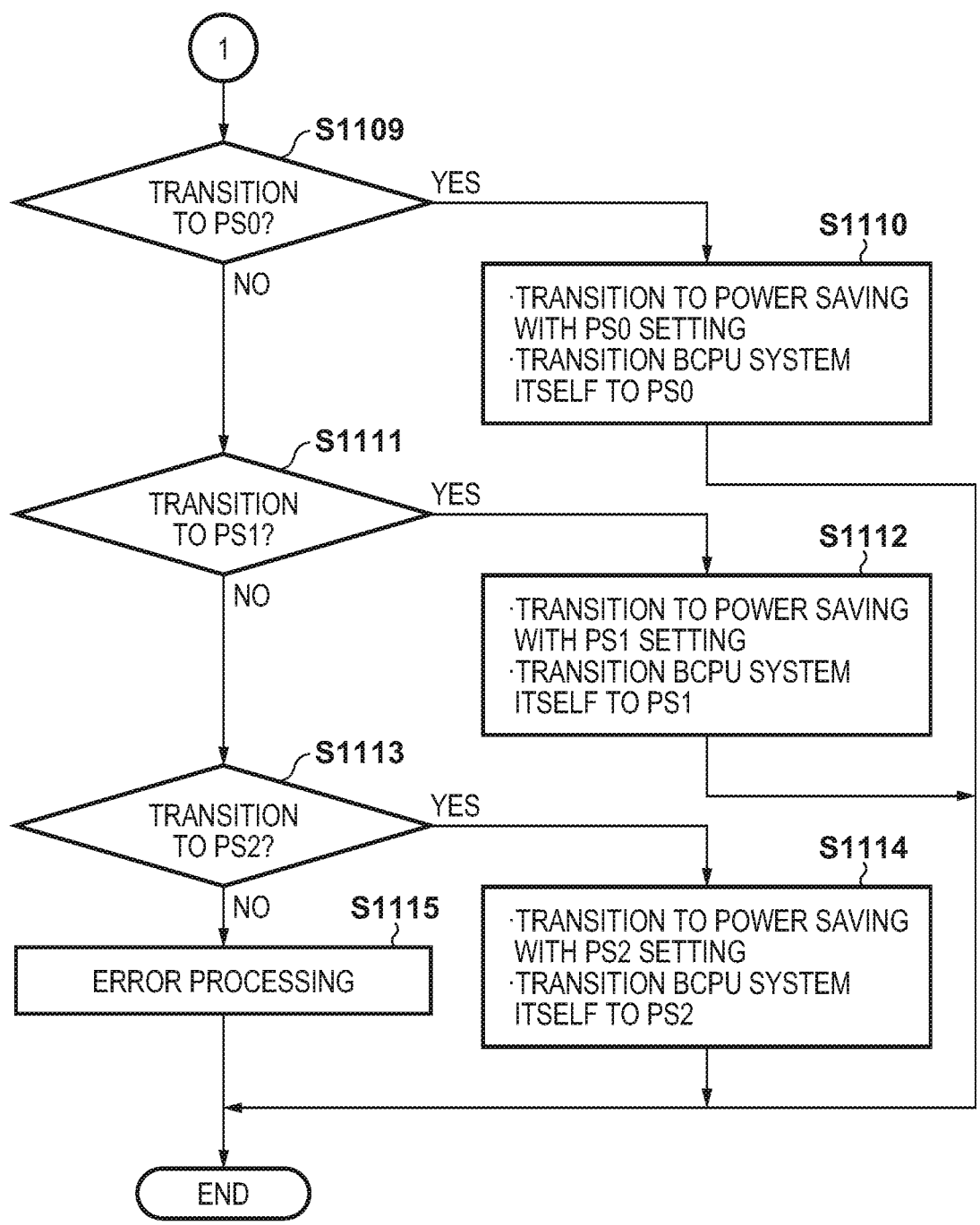

FIGS. 11A and 11B are flowcharts for describing processing performed when the SATA bridge controller 112 transitions to the power saving state according to the embodiment. Note that the processing shown in this flowchart is implemented by the BCPU 510 deploying a program stored in the flash memory 512 to the SRAM 513 and executing the deployed program.

First, in step S1101, the BCPU 510 standing by in the idle state is in a state standing by for an interrupt instruction from the HCPU 501 of the SATA host controller 111. The process advances to step S1102 upon receiving the interrupt instruction, and the BCPU 510 determines whether the received interrupt signal is a notification that the H-Host-IF 206 is transitioning to a power saving state. If the signal is a notification, the process advances to step S1109. Otherwise, the process advances to step S1103. In step S1103, the BCPU 510 determines whether the received interrupt signal is a power saving system extension command. If it is determined that the received interrupt signal is a power saving system extension command, the process advances to step S1105. Otherwise, the process advances to step S1104. In step S1104, the BCPU 510 executes other interrupt processing, for example, the ATA command or the like, and the BCPU returns again to the idle state of step S1101.

In step S1105, the BCPU 510 determines whether the received power saving system command is the ToSleep command 709. If it is determined that the received power saving system command is the ToSleep command, the process advances to step S1106, and the BCPU 510 sets the upper power status to the Sleep mode 603, registers it in the register B 514 or the SRAM 513, and causes the process to advance to step S1101. On the other hand, if it is determined that received power saving system command is not the ToSleep command 709 in step S1105, the process advances to step S1107. In step S1107, the BCPU 510 determines that the received power saving system command is the ToDeep command 713, sets the upper power status to the Deep mode 604 and registers it in the register B 514 or the SRAM 513. Subsequently, the process advances step S1108, and the BCPU 510 prepares to make the transition to the Deep mode 604. In the Deep mode 604, it is basically assumed that power-off processing executed by the power controller 209 will be performed. Hence, it is necessary to make power-off preparations for each IC of a type like the SATA bridge controller 112 which incorporates storage devices and flash memories that particularly do not allow instantaneous power interruption, and transmit a notification about the power off timing after the preparations have been completed. Whether the power-off preparation has been completed as the state of the PS2 can be obtained by the GetStatus command 717.

Note that although it is not shown in FIGS. 11A and 11B, the main CPU 101 will transmit a power-off permission notification to the power controller 209 after confirming that the power-off preparations of the SATA host controller 111 and the SATA bridge controller 112 have been completed. In addition, as an example of a preparation performed at the time of the powering off of the HDDs, it may be set so that a FLUSH CACHE command and the SLEEP command complying with the ATA standard are issued and a data save operation and a physical header save operation will be performed.

On the other hand, in step S1102, if the received interrupt signal is a power save transition notification of the H-Host-IF 206, the process advances to step S1109. In step S1109, the BCPU 510 determines whether the upper power status transitions to the state of the PS0 (FIG. 6) based on the Standby mode 602 and the item 611 of the preset power saving transition conditions of the H-Host-IF 206. If the BCPU 510 determines to transition to the state of the PS0 here, the process advances to step S1110. In step S1110, the BCPU 510 executes transition processing to the state of the PS0 based on the item 615 of the preset power saving transition conditions of the B-Host1-IF 207 and the B-Host2-IF 208 and the item 619 of the power saving transition conditions of each HDD main body. Finally, the BCPU 510 transitions its own system to the power saving state of the PS0, and completes this transition processing.

In addition, if the BCPU 510 determines in step S1109 not to transition to the PS0, the process advances to step S1111. In step S1111, the BCPU 510 determines whether the upper power status transitions to the state of the PS1 based on the Sleep mode 603 and the item 612 of the preset power saving transition conditions of the H-Host-IF 206. If the BCPU 510 determines to transition to the state of the PS1 here, the process advances to step S1112. In step S1112, the BCPU 510 executes transition processing to the state of the PS1 based on the item 616 of the preset power saving transition conditions of the B-Host1-IF 207 and the B-Host2-IF 208 and the item 620 of the power saving transition conditions of each HDD main body. Finally, the BCPU 510 transitions its own system to the power saving state of the PS1, and completes this transition processing.

In addition, if the BCPU 510 determines not to transition to the PS1 in step S1111, the process advances to step S1113. In step S1113, the BCPU 510 determines whether the upper power status transitions to the state of the PS2 based on the Deep mode 604 and the item 613 of the preset power saving transition conditions of the H-Host-IF 206. If the BCPU 510 determines to transition to the state of the PS2 here, the process advances to step S1114. In step S1114, the BCPU 510 executes transition processing to the state of the PS2 based on the item 617 of the preset power saving transition conditions of the B-Host1-IF 207 and the B-Host2-IF 208 and the item 621 of the power saving transition conditions of each HDD main body. Finally, the BCPU 510 transitions its own system to the power saving state of the PS2, and completes this transition processing.

Furthermore, if the BCPU 510 determines, in step S1113, not to transition to the PS2, the process advances to step S1115. In step S1115, the BCPU 510 determines that the power transition operation has failed and executes error processing. Although operations such as status notification to the host and the like will be performed at this time, a description will be omitted.

To summarize the above description, in the determination of transition to one of the power saving states of the PS0 to the PS2 in the SATA bridge controller 112, determination is performed based on which of the PS0 to the PS2 is indicated by two pieces of information, that is, the upper power status (the Standby mode 602, the Sleep mode 603, and the Deep mode 604) information and the power saving state of the H-Host-IF 206.

Particularly, in the case of the PS0 or the PS1, if the items 619 to 620 of the power saving transition conditions of each HDD main body indicates a power-off instruction (the power off-1 or the power off-2) here, the BCPU 510 will transmit a HDD power-off request (set the output signal OUTB to low level) to the power controller 209 as described in FIGS. 3 and 4.

Figure 12A:
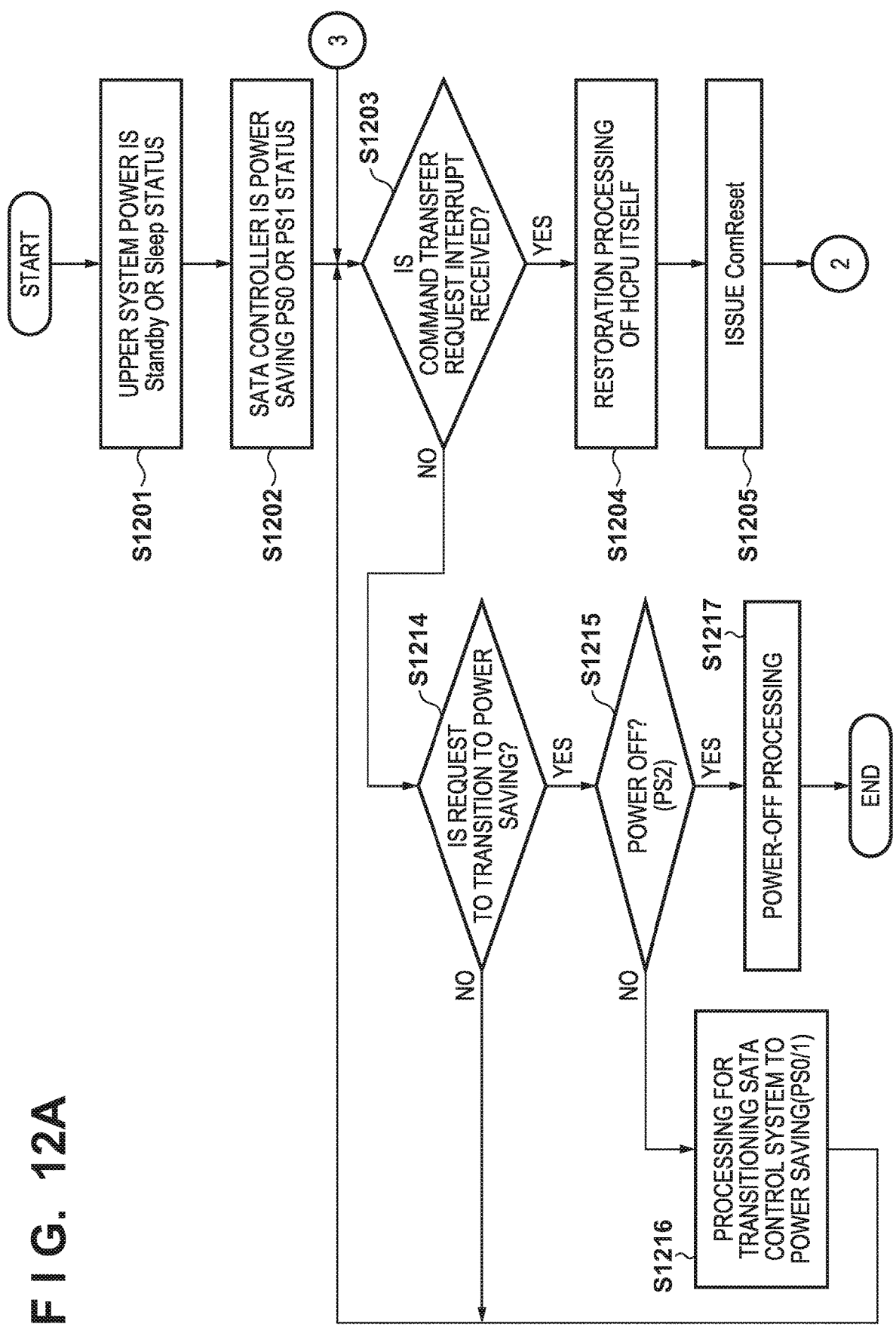
FIGS. 12A and 12B are flowcharts for describing processing which is performed when the SATA host controller is restored from PS0 or PS1 according to the embodiment.
Figure 12B:
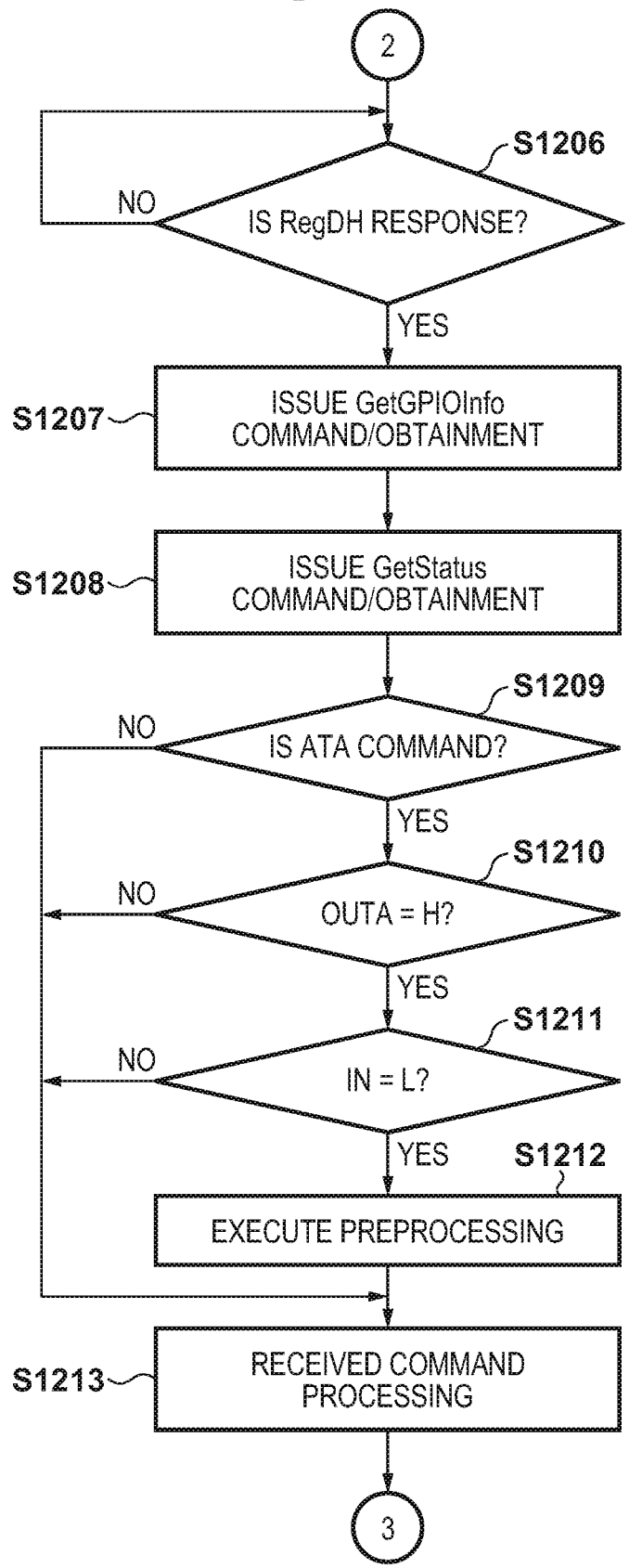

FIGS. 12A and 12B are flowcharts for describing the processing performed when the SATA host controller 111 is to be restored from the PS0 or the PS1 according to the embodiment. Note that the processing shown in this flowchart is implemented by the HCPU 501 deploying a program stored in the flash memory 503 to the SRAM 504 and executing the deployed program.

First, in step S1201, assume that the upper power status is either the Standby mode 602 or the Sleep mode 603. In addition, assume that, at this time, the HCPU 501 is set to the power saving state of the PS0 or the PS1 in step S1202. Although it is a matter of course that the HDDs can be accessed in the Standby state here, but there may be a case in which access to the HDDs becomes required even when the upper power status is set to the Sleep state. In this case, the SATA control system will be partially restored even if it is in the Sleep state. Cases like this can be, for example, a case in which the SMART information is acquired to obtain the parameters (an off/on count, a bad sector count, and the like) related to the lifetime of each HDD. On the other hand, there may be a case in which only the SATA control system is powered on while maintaining the HDD in the power-off state when each HDD is not scheduled to be used at the time of restoration from the Sleep state.

The process advances to step S1203, and the HCPU 501 continues to maintain the power saving state of the PS0 or the PS1 if no interrupt request is received while it is in a standby state for an interrupt request from the main CPU 101. If a command transfer request interrupt is received in step S1203, the HCPU 501 advances the process to step S1204, and the HCPU 501 executes its own restoration (boot) processing. Then, in step S1205 and step S1206, the HCPU 501 executes the restoration processing of the H-Host-IF 206. More specifically, in step S1205, the HCPU 501 starts issuing a ComRest signal, which is a reset signal defined in the SATA standard, and performs, after undergoing predetermined sequences such as speed negotiation and OOB (Out Of Band) defined in the standard, link establishment processing until it is capable of issuing commands. Subsequently, in step S1206, the HCPU 501 stands by until it receives RegDH (Register Device to Host) defined in the SATA standard. If the HCPU 501 receives RegDH in step S1206 and determines that the status is in the ready state, the HCPU 501 will recognize that a command issuable link has been established and cause the process the advance to step S1207.

In step S1207, the HCPU 501 issues the GetGPIOInfo command 721 and obtains the GPIO information of the SATA bridge controller 112. Next, the process advances to step S1208, and the HCPU 501 will issue the GetStatus command 717, obtain the internal state of the SATA bridge controller 112, and cause the process to advance to step S1209. In step S1209, the HCPU 501 determines whether the received command is an ATA command. If the command is not an ATA command, the process advances to step S1213, and processing of the received command will be performed. On the other hand, if it is determined, in step S1209, that the command is an ATA command, the process advances to step S1210. In step S1210 and step S1211, the HCPU 501 determines, based on the OUTA 301 and the IN 305 included in the GPIO information, whether to execute preprocessing after the restoration which is accompanied by access to the HDDs. If the HCPU 501 determines that the OUTA 301 is at high level and the IN 305 is at low level in step S1210 and step S1211, the process advances to step S1212. That is, in a case in which the BCPU 510 of the SATA bridge controller 112 is clearly performing HDD power control and is intentionally setting the power of the HDDs in the OFF state, the HCPU 501 will immediately execute the preprocessing. On the other hand, if the OUTA 301 is at low level and the IN 305 is at high level, the HCPU 501 will skip step S1212 and will cause the process to advance to step S1213.

Note that the preprocessing performed in step S1212 includes at least the HDD password lock releasing processing as described in FIG. 9. The state of each device is confirmed by the IDENTIFY DEVICE command 805 described in FIG. 8, and the SECURITY UNLOCK command 813 will be transmitted to the HDD if it is in the locked state. When the preprocessing is executed at this time, the BCPU 510 is required, in order to transmit the ATA command, to power on the HDDs by controlling the OUTA 301, the OUTB 302, and the IN 305.

In step S1213, the HCPU 501 performs the processing of the received ATA command, causes the process to return to step S1203 after the processing is completed, and enters the command transfer request interrupt standby state again. Although a description of the detail will be omitted in FIGS. 12A and 12B, if the HCPU 501 does not receive a command in step S1203 even after a predetermined time has elapsed, the process advances to step S1214.

In step S1214, the HCPU 501 determines whether there is a request to transition to the power saving state of the PS0/PS1, causes the process to return to step S1203 if there is no subsequent request, and enters the command request standby state of the idle state again. On the other hand, if the HCPU 501 determines in step S1214 that there is the request to transition to the PS0/PS1, the process advances to step S1215. In step S1215, the HCPU 501 determines whether or not to perform the power-off operation (PS2). If the HCPU 501 determines not to perform the power-off operation (PS2) here, the process advances to step S1216. The HCPU 501 performs processing to cause the SATA control system to transition to the power saving state of the PS0 or the PS1, causes the process to advance to step S1203, and enters the command standby state in the power saving state. If the HCPU 501 determines, in step S1215, to perform the power-off operation (PS2), the process advances to step S1217. The HCPU 501 will stop the series of SATA control processes after performing the power-off processing (shutdown processing), and stands by until the power controller 209 is powered off.

Figure 13A:
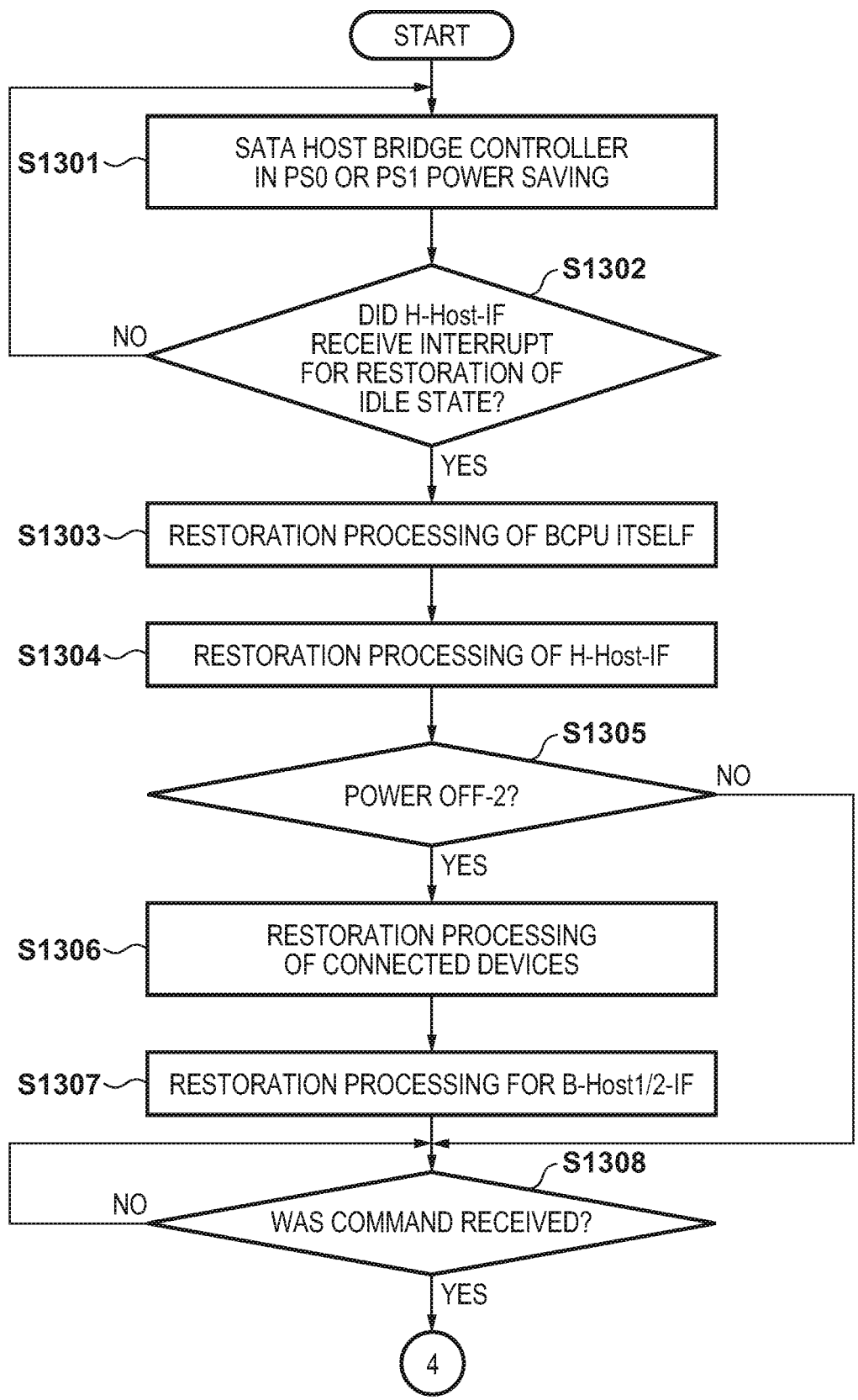
FIGS. 13A and 13B are flowcharts for describing processing which is performed when the SATA bridge controller is restored from the PS0 or the PS1 according to the embodiment.
Figure 13B:
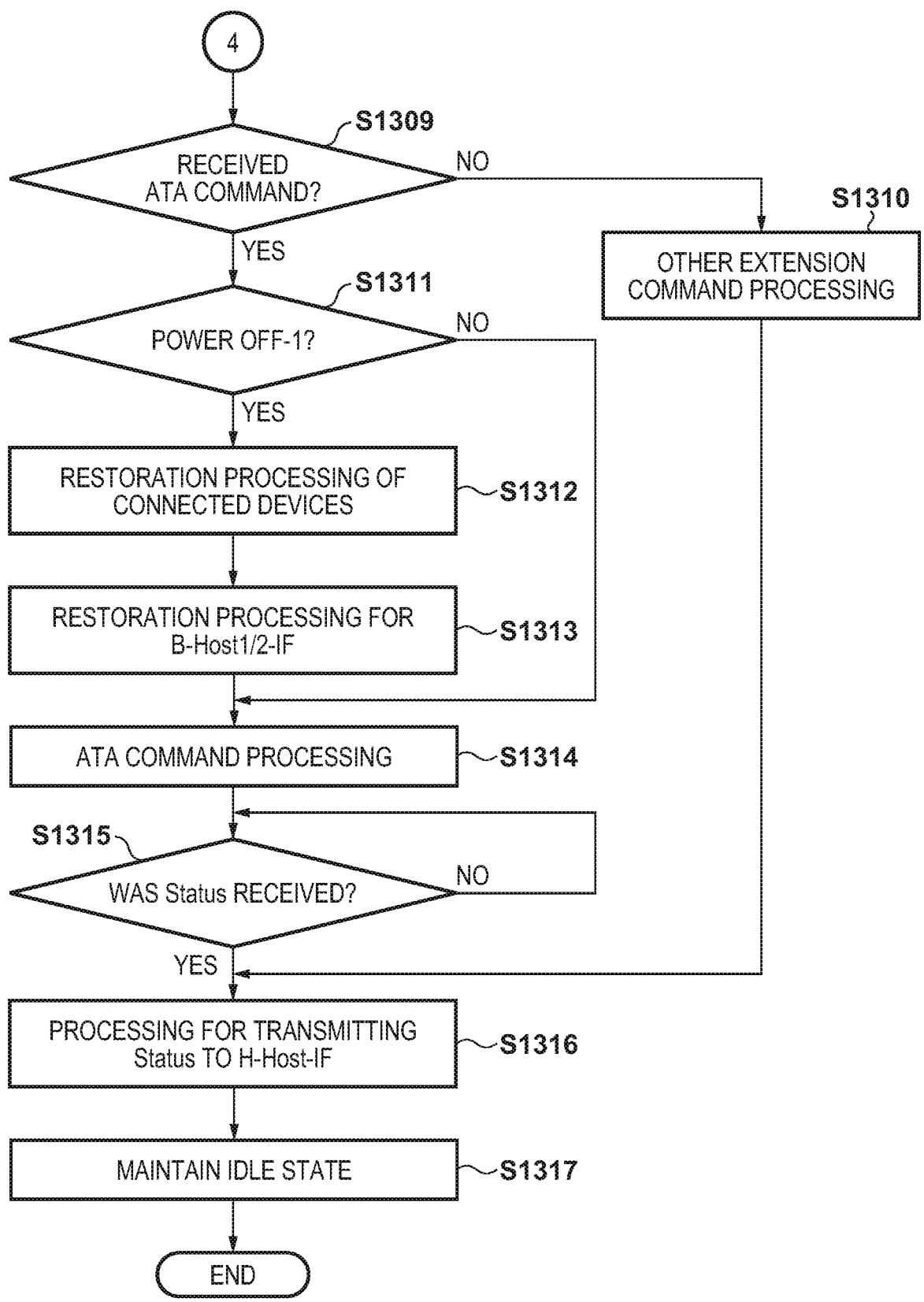

FIGS. 13A and 13B are flowcharts for describing the processing when the SATA bridge controller 112 is restored from the PS0 or the PS1 according to the embodiment. Note that the processing shown in this flowchart is implemented by the BCPU 510 deploying a program stored in the flash memory 512 to the SRAM 513 and executing the deployed program.

In step S1301, the BCPU 510 is in the power saving state of the PS0 or the PS1. In addition, in step S1302, the BCPU 510 is in the interrupt request standby state. If there is no interrupt request (that is, NO in step S1302), the BCPU 510 causes the process to return to step S1301, and the power saving state of the PS0 or the PS1 is continued. In step S1302, when the BCPU 510 receives an interrupt to start the processing to restore the H-Host-IF 206 to the idle state, the process advances to step S1303. The detection of an interrupt indicating the start of the restoration processing described here can be performed by detecting the changes in the levels at which the DEVSLP signal is enabled or the interrupt signal issued by ComRest (or ComWake) described in FIGS. 12A and 12B. In step S1303, the BCPU 510 performs its own restoration processing. Next, the process advances to step S1304, and the BCPU 510 executes the restoration processing of the H-Host-IF 206. More specifically, after undergoing predetermined sequences such as speed negotiation and OOB (Out Of Band) defined in the SATA standard, the BCPU 510 performs link establishment processing until command issuance is possible.

The process advances next to step S1305, and the BCPU 510 determines whether the transition setting condition of the main body at the time of the previous power saving transition was the power off-2 which is a setting with the powering on of the HDDs. In order to perform this determination, the BCPU 510 is required to record whether the transition setting condition of the device main body at the time of the previous power saving transition is power off-1 or power off-2 so that it can be determined at the time of the next restoration processing. In the power saving states of the PS0 and the PS1, it is assumed that, although at least the SATA controller of the BCPU 510 and the HCPU 501 will transition to the power saving state, the power will not be turned off. Hence, by storing the determination information of the power off-1 or the power off-2 in, for example, the register H 506 and the register B 514, the information can be referred to at the time of the determination. Note that the stored information is used only at the time of the next restoration operation from the power saving state, and the stored information will be cleared after the restoration has been completed.

In step S1305, if the BCPU 510 determines that the transition setting condition at the time of the previous power saving transition was the power off-2 and if the IN 305 is at low level, the process advances to step S1306. In step S1306, the BCPU 510 performs the restoration processing of the connected devices. At this time, if the HDDs 113 and 114 serving as the connected devices are set to the power-off state, the BCPU 510 transmits an HDD power-on request to the power controller 209 as described in FIGS. 3 and 4. Next, the process advances to step S1307, and the BCPU 510 executes the restoration processing of the B-Host1-IF 207 and the B-Host2-IF 208. Since this restoration processing is the same as the restoration processing of the H-Host-IF 206 described in FIGS. 12A and 12B, a description will be omitted. In this manner, if the process of step S1307 is complete or if it is determined instep S1305 that the transition setting condition is not the power off-2, the process advances to step S1308. In step S1308, after confirming the establishment of the link, the BCPU 510 transitions to the command reception standby state. The restoration operation from the power saving state to the idle state is complete at this point.

In step S1308, in a period in which a command is not received, the BCPU 510 maintains the process at step S1308, and causes the process to advance to step S1309 upon receiving the command. In step S1309, the BCPU 510 determines whether the received command is an ATA command. The process will advance to step S1311 if the ATA command has been received, but otherwise the process will advance to step S1310. In step S1310, the BCPU 510 executes processing of another extension command and subsequently causes the process to advance to step S1316.

In step S1311, the BCPU 510 determines whether the transition setting condition of the device main body at the time of the previous power saving transition was the power off-1 in which the HDDs are powered off. In step S1311, if the previous transition setting condition is the power off-1 and the IN 305 is at low level, the process advances to step S1312. The restoration processing operations of the connected devices and the SATA-IFs performed in steps S1312 and S1313 are the same as that performed in steps S1306 and S1307 already described above, and thus a description will be omitted. If the process of step S1313 is completed or if it is determined in step S1311 that the transition setting condition is not the power off-1, the process advances to step S1314. In step S1314, the BCPU 510 executes the ATA command processing. Next, the process advances to step S1315, and the BCPU 510 changes to a standby state to receive statuses from the HDDs 113 and 114. The BCPU 510 stands by in step S1315 while the statuses have not been received, and causes the process to advance to step S1316 upon reception of the statuses. In step S1316, the BCPU 510 reflects the pieces of status information received from the HDDs or the processing result of the other extension command performed in step S1310 onto a status packet which is defined in compliance with the SATA standard, and the BCPU 510 transmits the status packet to the SATA-IP (Host) 202. The series of command processing is completed in this manner. Subsequently, the process advances to step S1317, and the BCPU 510 maintains the idle state until the main CPU 101 issues a power saving transition request again.

Figure 14A:
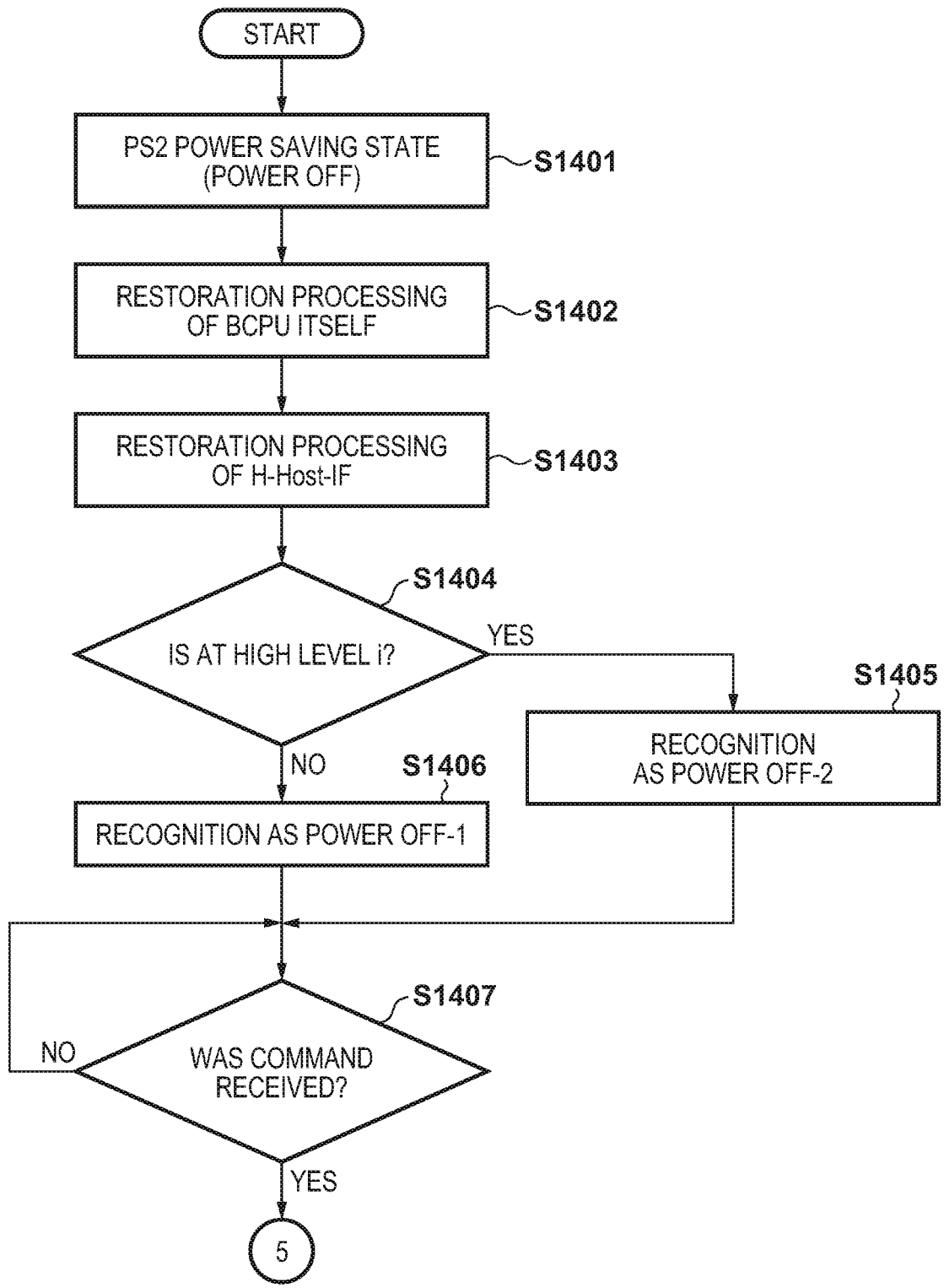
FIGS. 14A and 14B are flowcharts for describing processing which is performed when the SATA bridge controller is restored from a Deep state of PS2 according to the embodiment.
Figure 14B:
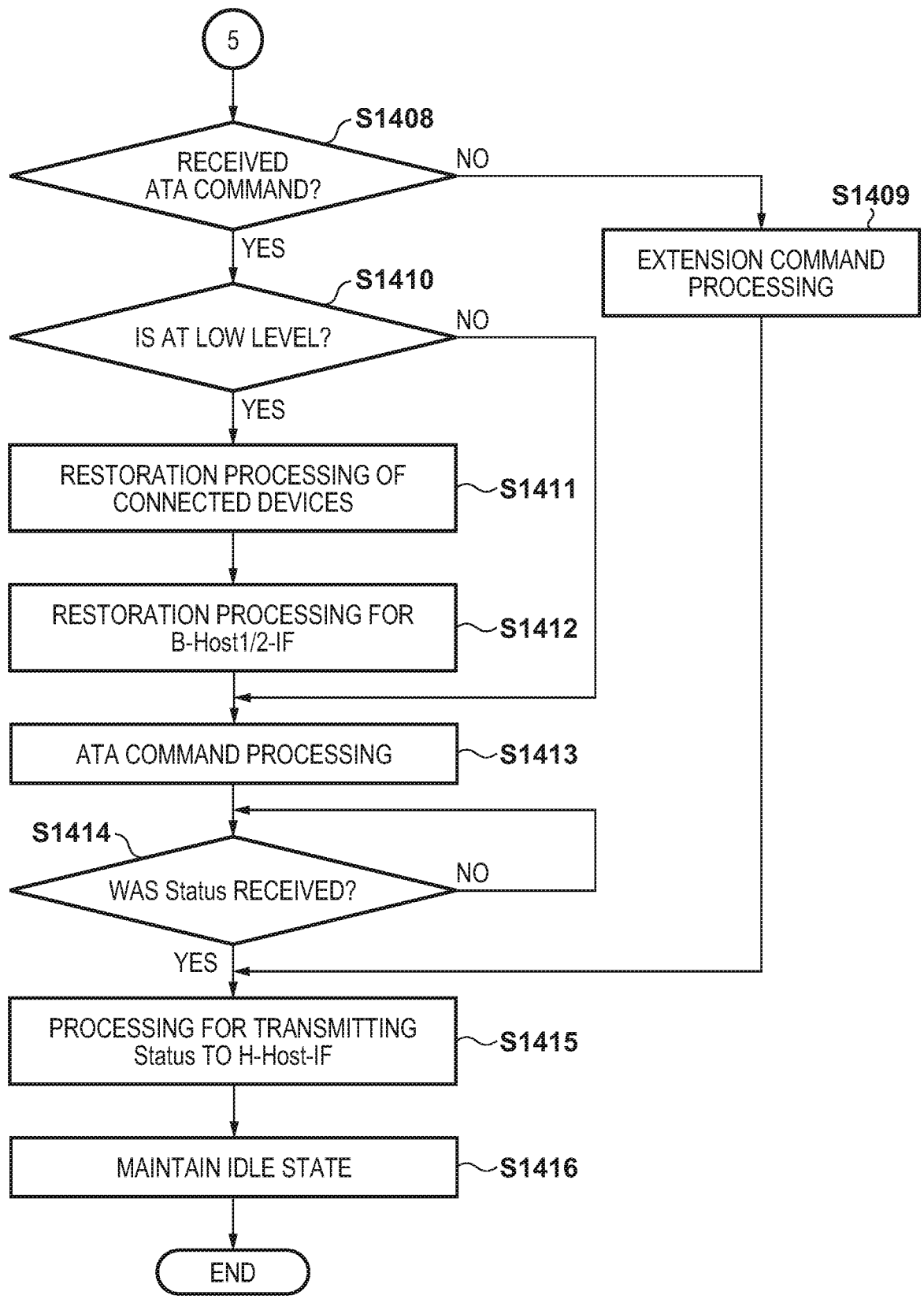

FIGS. 14A and 14B are flowcharts for describing the processing performed when the SATA bridge controller 112 is restored from the Deep state of the PS2 according to the embodiment. Note that the processing shown in this flowchart is implemented by the BCPU 510 deploying a program stored in the flash memory 512 to the SRAM 513 and executing the deployed program. Note that a description in which HDDs are assumed to be the connected devices will be given hereinafter.

First, in step S1401, the HCPU 501 and the BCPU 510 are set to the power-off state by the previous transition processing to the power saving state PS2. Subsequently, the power controller 209 starts the power supply (that is, sets the power to ON) to the SATA host controller 111 and the SATA bridge controller 112. In step S1402, the BCPU 510 executes its own restoration processing (boot processing). Next, the process advances to step S1403, and the BCPU 510 execute the restoration processing of the H-Host-IF 206. More specifically, the boot processing of the HCPU 501 is simultaneously started with the boot processing of the BCPU 510. Subsequently, in the restoration processing of the H-Host-IF 206, a link is established after undergoing speed negotiation processing and OOB based on the ComRest signal from the SATA-IP (Host) 202 to the SATA-IP (Device) 203 as already described above.

After the link is established in step S1403 in this manner, the BCPU 510 executes processing to establish a link to a SATA lower layer. In step S1404, the BCPU 510 determines whether the IN 305 which is used to monitor the power supply state to the HDDs is at high level, and the BCPU 510 performs HDD power off/on determination. In step S1404, if it is determined that the IN 305 is at high level, the process advances to step S1405. In step S1405, the BCPU 510 recognizes that the current state is set to the power off-2 (restoration with the powering on of the HDDs), and causes the process to advance to step S1407. On the other hand, in step S1404, if it is determined that the IN is at low level, the process advances to step S1406, and the BCPU 510 recognizes that the current state is set to the power off-1 (restoration without the powering on of the HDDs), and causes the process to advance to step S1407.

The GetStatus command 717 can be used not only to confirm the transition to a power saving state but also to obtain the connection statuses of the HDDs. After the SATA host controller 111 and the SATA bridge controller 112 have been activated, the main CPU 101 will determine that an error has occurred if an HDD connection OK status (link established state) cannot be recognized within a predetermined time. In the embodiment, it is set so that an unconnected state 1 (connection error)/unconnected state 2 (an unconnected state according to the power off-1) can be discriminated in the HDD connection status confirmation performed by the GetStatus command 717.

Figure 15:
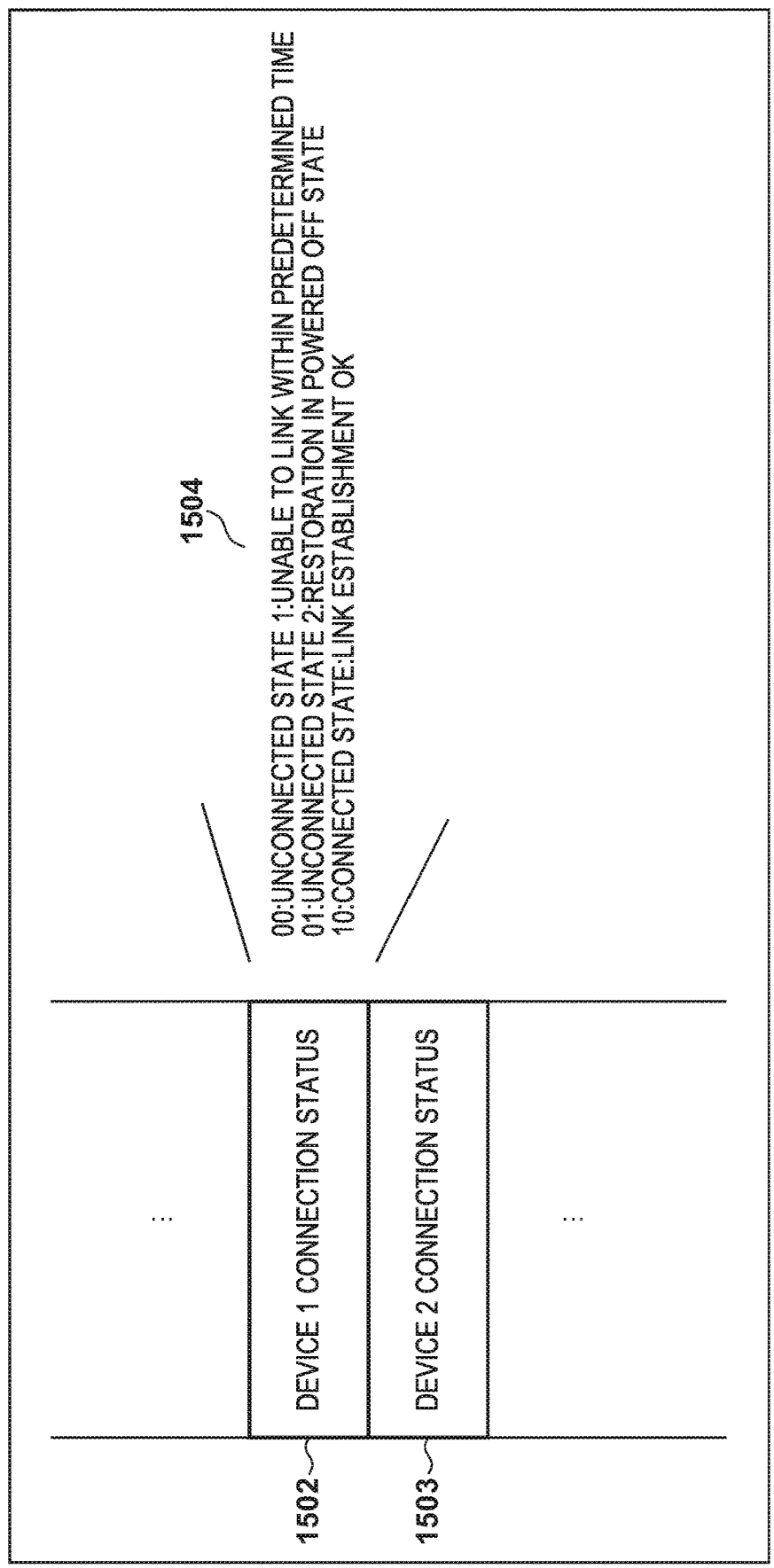
FIG. 15 is a view for describing an example of a state which is reported by a GetStatus command.

FIG. 15 depict a view for explaining an example of statuses reported by the GetStatus command 717.

A device 1 connection status 1502 and a device 2 connection status 1503 are provided as parts of contents to be reported by the GetStatus command 717, and a status definition 1504 is further included in each connection status. For example, a restoration which is performed intentionally in a power-off state is reported as a status "01" (unconnected state 2) to the main CPU 101. Based on the recognition results obtained in step S1405 or step S1406, the BCPU 510 can appropriately indicate the HDD connection status report by the GetStatus command 717 as the "unconnected state 2" (restoration in a state in which each HDD is in the power-off state). After confirming this "unconnected state 2", the main CPU 101 will recognize that this case is an intentional unconnected state and will not set this case as an error processing target.

Next, in step S1407, upon confirming that a link has been established by the upper layer, the BCPU 510 will transition to a command reception standby state. Restoration from the power saving state to the idle state is completed at this point. In step S1407, in a period in which a command is not received, the BCPU 510 maintains the process at step S1407, and causes the process to advance to step S1408 upon receiving the command. In step S1408, the BCPU 510 determines whether the received command is an ATA command. The process will advance to step S1410 if the ATA command has been received, and the BCPU 510 determines whether the IN 305 for monitoring the power supply state of each HDD is at low level, that is, whether each HDD is in the power-off state. In step S1410, if the IN 305 for monitoring the power supply state of each HDD is at low level, that is, if each HDD is in the power-off state, the process advances to step S1411. Otherwise, the process advances to step S1413. In steps S1411 and S1412, the BCPU 510 transmits an HDD power-on request to the power controller 209 and executes the restoration processing of the connection IF, and the process advances to step S1413. The processes of steps S1411 and S1412 are the same as those already described above, and thus a description will be omitted.

In step S1413, the BCPU 510 executes the ATA command processing. Next, the process advances to step S1414, and the BCPU 510 transitions to the standby state to receive the statuses from the HDDs 113 and 114. The BCPU 510 remains in a standby state in a period in which the statuses are not received, and causes the process to advance to step S1415 upon receiving the statuses. Also, in step S1408, if the BCPU 510 determines that the received command is an extension command other than the ATA command, the process advances to step S1409. In step S1409, the BCPU 510 executes the extension command processing and subsequently causes the process to advance to step S1415. In step S1415, the BCPU 510 reflects the pieces of status information received from the HDDs 113 and 114 or the processing result of the extension command onto a status packet defined in compliance with the SATA standard, and transmits the packet to the SATA-IP (Host) 202. The series of command processing is completed in this manner. Subsequently, the process advances to step S1416, and the SATA host bridge controller 112 continues to maintain the idle state until the main CPU 101 issues the power saving transition request again.

Figure 16A:
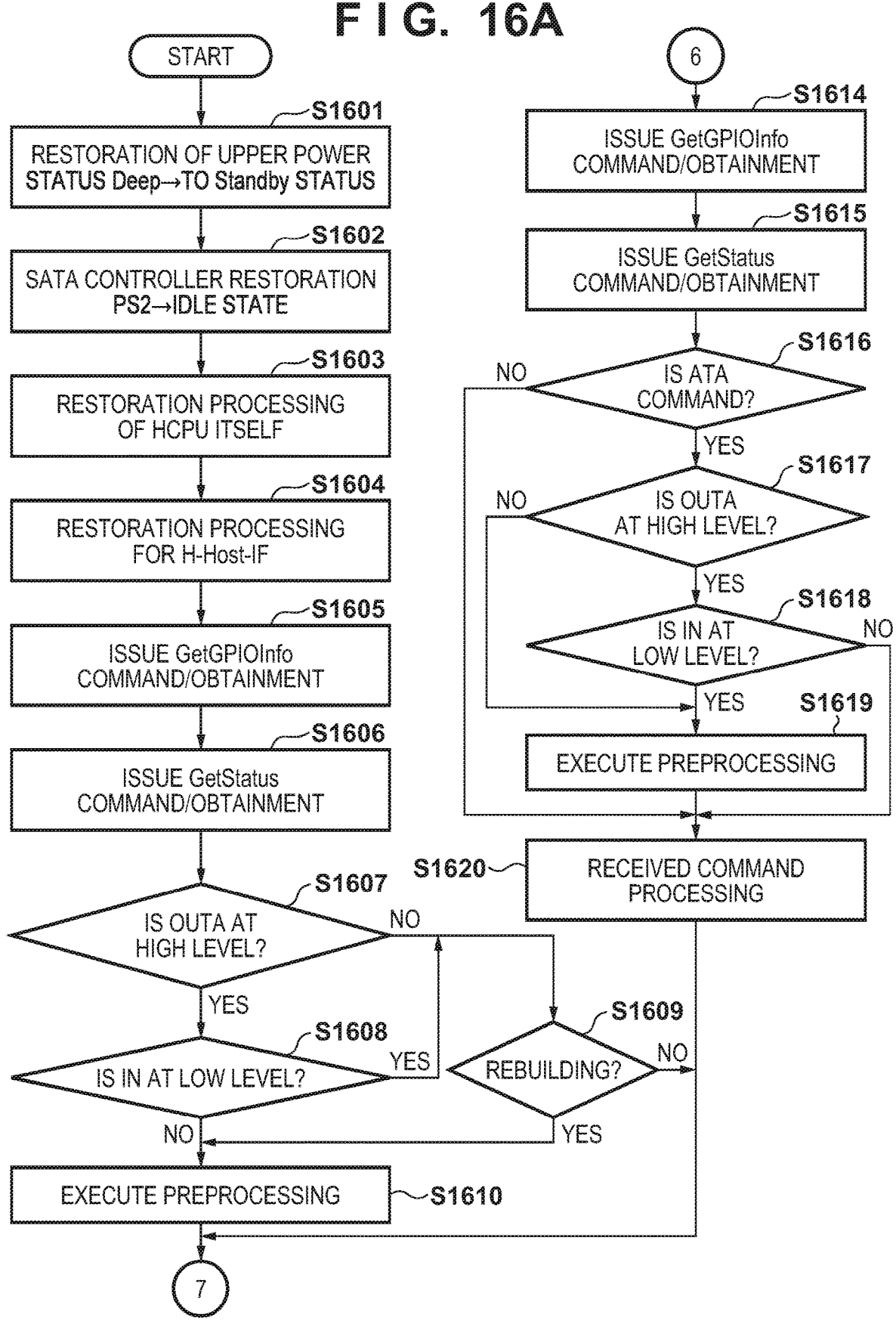
FIGS. 16A and 16B are flowcharts for describing processing which is performed when the SATA host controller is restored from the Deep state of the PS2 according to the embodiment.
Figure 16B:
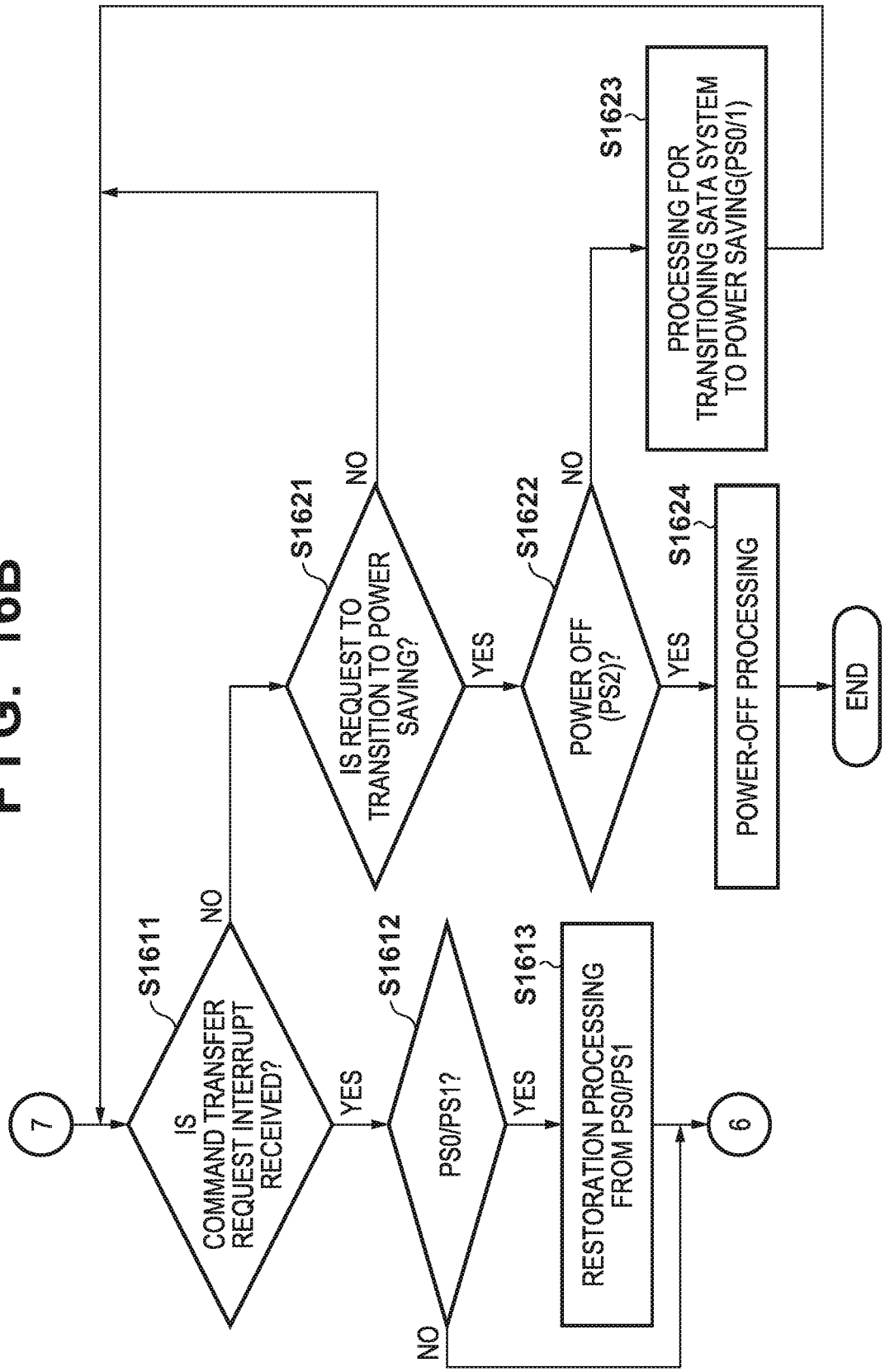

FIGS. 16A and 16B are flowcharts for describing processing performed when the SATA host controller 111 is restored from the Deep state of the PS2. Note that the processing shown in this flowchart is implemented by the HCPU 501 deploying a program stored in the flash memory 503 to the SRAM 504 and executing the deployed program.

In step S1601, the main CPU 101 has been restored from the power saving state of the Deep state (PS2) to the Standby state. In step S1602, the HCPU 501 starts the restoration processing from the PS2. In step S1603, the HCPU 501 executes its own restoration (boot) processing. The BCPU 510 of the SATA bridge controller 112 is also booted simultaneously at this time. When the restoration processing of the HCPU 501 is completed in this manner, the process advances to step S1604, and the restoration processing (link establishment) of the H-Host-IF 206 is executed. The process advances to step S1605, and the HCPU 501 issues a GetGPIOInfo command and obtains, in step S1606, the GPIO information and the internal status of the SATA bridge controller 112 by the GetStatus command. The processes of steps S1603 to S1606 are the same as those already described in steps S1204 to S1208 in FIGS. 12A and 12B, and thus a detailed description will be omitted.

Next, in step S1607 and step S1608, the HCPU 501 causes the process to advance to step S1609 if the OUTA 301 is at high level and the IN 305 is at low level, that is, if it is clear that the BCPU 510 is performing HDD power control and has set each HDD to the power-off state. Otherwise, the process advances to step S1610. In step S1609, the HCPU 501 determines whether the state of the SATA bridge controller 112 obtained by the GetStatus command indicates that rebuild processing (for example, copy processing from the HDD 113 to the HDD 114 or background processing by the BCPU 510) by the mirroring mode is currently being performed. If the GetStatus command indicates that the rebuild processing is currently being performed, the process advances to step S1610. That is, in a case in which the power controller 209 is performing activation by powering off the HDDs or in a case in which the BCPU 510 is to perform activation by intentionally powering on the HDDs and, in addition, the rebuild processing is being performed, the rebuild processing will be prioritized. Subsequently, the process advances to step S1611 after the preprocessing is performed in step S1610, and each HDD will be maintained in the power-off state for other conditions.

In step S1611, the HCPU 501 will enter the standby state to receive the command transfer request interrupt. Although details will be omitted here since this has been already described above, in step S1611, the HCPU 501 will stand by for the command request interrupt in step S1611 by transitioning to the power saving state again if there is no access to the SATA in a predetermined period (short period). When the HCPU 501 accepts the reception of an interrupt in step S1611, the process advances to step S1612, and it is determined whether the power saving state PS0/PS1 is set. If it is determined that the PS0/PS1 is set here, the process advance to step S1613, the HCPU 501 executes the restoration processing from the PS0 or the PS1, and the process advances to step S1614. Also, if it is determined in step S1612 that the PS0/PS1 is not set, the process advances to step S1614.

In step S1614 and step S1615, the HCPU 501 obtains the GPIO information and the internal status of the SATA bridge controller 112 by the GetGPIOInfo command 721 and the GetStatus command 717. Subsequently, the process advances to step S1616, and the HCPU 501 determines whether the received command is an ATA command. If it is determined that the received command is not an ATA command, the process advances to step S1620, and the extension command processing is performed.

On the other hand, if it is determined in step S1616 that the received command is the ATA command, the process advances to step S1617. In step S1617 and step S1618, the HCPU 501 determines, based on the OUTA 301 and the IN 305 included in the GPIO information, whether to execute preprocessing after the restoration which is accompanied by access to the HDDs. That is, in step S1617 and step S1618, if the HCPU 501 determines that the OUTA 301 is at high level and the IN 305 is at low level or OUTA 301 is at low level, the process advances to step S1619. That is, in a case in which the BCPU 510 is clearly executing HDD power control and has intentionally set each HDD to the power-off state, or in a case in which the power controller 209 is performing control, the preprocessing is executed immediately. On the other hand, if it is determined that the OUTA 301 is at high level and the IN 305 is at low level, the preprocessing of step S1619 is skipped, and the process advances to step S1620.

In step S1620, the HCPU 501 executes the processing of the received ATA command. When the ATA command processing has been completed, the process advances to step S1611, and the HCPU 501 stands by for the next command request interrupt in the idle state. Although it is not shown in FIGS. 16A and 16B, if a command transfer request is not received after the elapse of a predetermined time in step S1611, the process advances to step S1621. In step S1621, the HCPU 501 determines whether a transition request to the power saving state PS0 or PS1 is present. If a transition request is not present, the process advances to step S1611, and the HCPU 501 enters the command request standby state of the idle state. On the other hand, if a transition request is present in step S1621, the process advances to step S1622, and the HCPU 501 determines whether to perform a power-off operation (PS2). If the HCPU 501 determines to perform the power-off operation (PS2), the process advances to step S1624. In step S1624, after performing the power-off processing (PS2 processing), the HCPU 501 stops the series of SATA control and stands by until the power controller 209 is powered off. In addition, if the HCPU 501 determines in step S1622 to transition to the power saving state of the PS0/PS1 instead of performing the power-off operation (PS2), the process advances to step S1623. The HCPU 501 performs the power saving transition processing to cause the SATA control system to transition to the PS0 or the PS1, causes the process advance to step S1611, and enters the command standby state in the power saving state.

Figure 17:
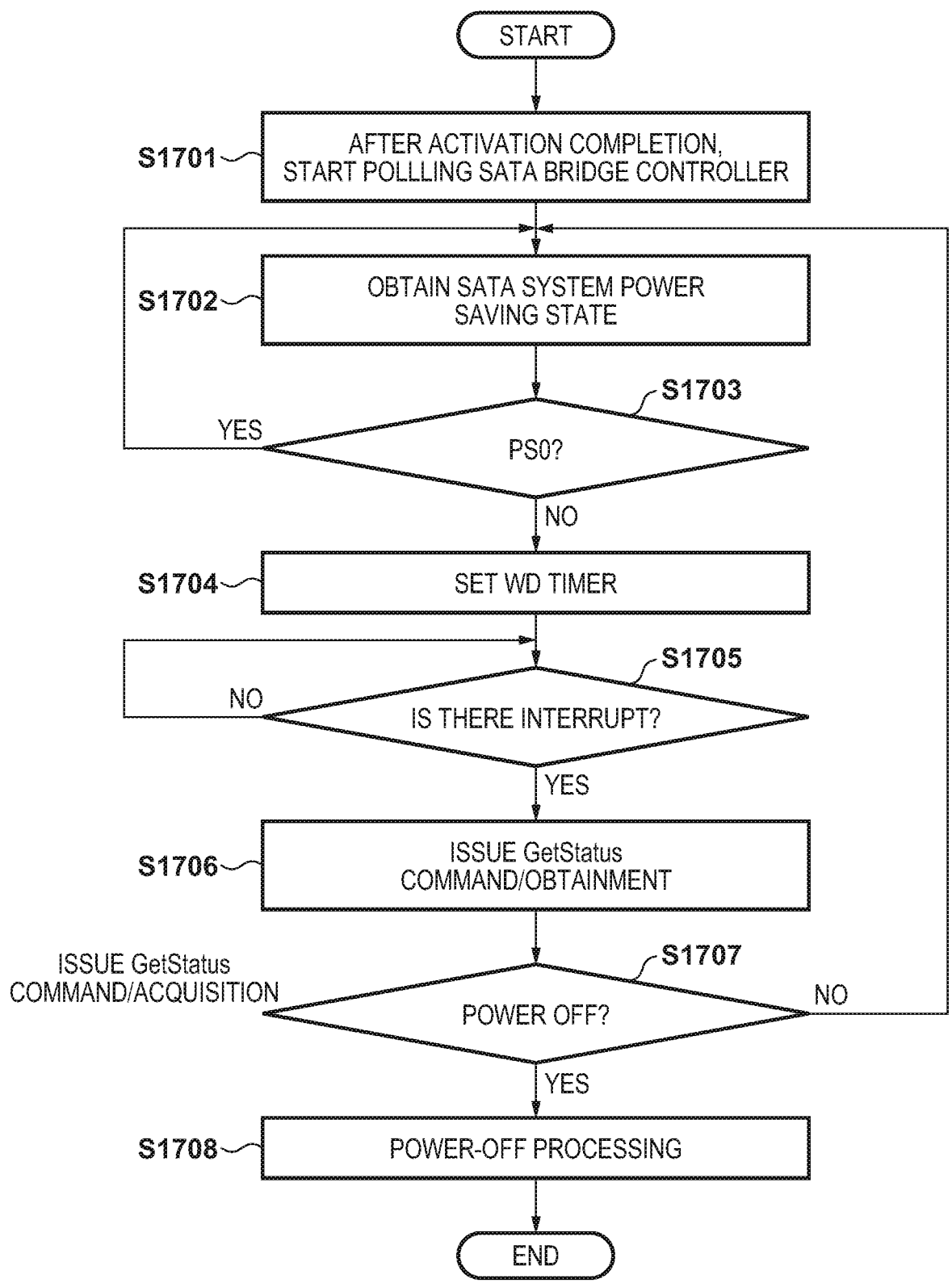
FIG. 17 is a flowchart for describing processing in which a main CPU of the main controller polls the internal state of the SATA bridge controller in the power saving state PS0 according to the embodiment.

FIG. 17 is a flowchart for describing processing in which the main CPU 101 of the main controller 120 polls the internal state of the SATA bridge controller 112 when the power saving state PS0 is set according to the embodiment. Note that the processing shown in this flowchart is implemented by the main CPU 101 deploying a program stored in the flash memory 103 to the DRAM 104 and executing the deployed program.

In the Standby state of the main CPU 101, the main CPU 101 periodically obtains, by the GetStatus command, the internal state of the SATA bridge controller 112 which is a control system positioned at the terminal end of the system. For example, in a case in which the SATA bridge controller 112 is mounted on a separate board as an option, the cost will increase if a control signal (for example, a status interrupt signal or the like) other than that from each SATA-IF is connected as a sideband signal via another route. Hence, the internal state of the SATA bridge controller 112 is obtained by the polling method of periodically transmitting the GetStatus command. In this case, even though the SATA control system is set to the power saving state, the SATA control system will be restored from the power saving state each time the command is received. FIG. 17 will explain a method to avoid such a state.

First, in step S1701, when it has stabilized in the Standby state after the completion of the activation, the main CPU 101 starts the polling by the GetStatus command for periodically confirming the internal state of the SATA host controller 111. Next, the process advances to step S1702, and the main CPU 101 obtains, for example, from the register H 506, a flag indicating whether the SATA control system is in the power saving state. Next, the process advances to step S1703, and the main CPU 101 determines whether the flag indicates the state of the PS0. If the flag indicates the state of the PS0, the process advances to step S1702, and the polling processing is set to a held state. On the other hand, if the state of the PS0 is not indicated in step S1703, the process advances to step S1704, and the main CPU 101 sets a predetermined time to a WD (watchdog) timer. The process advances to step S1705, and the main CPU 101 determines whether the predetermined time has elapsed. If the main CPU determines that the predetermined time has elapsed, the process advances to step S1706, and the main CPU 101 obtains the internal state of the SATA host controller 111 by transmitting the GetStatus command. Subsequently, the process advances to step S1707, and the main CPU 101 determines whether there is a power off request. If there is such a request, the process advances to step S1708, the main CPU prepares (stops the polling processing and the like) for the power-off operation, and the processing ends. On the other hand, if there is no power off request in step S1707, the process returns to step S1702.

In this manner, after confirming whether the SATA control system is in the power saving state, the next GetStatus command is transmitted. In a case in which the SATA control system is in the power saving state, this processing allows the power saving state to be maintained by preventing the SATA control system from being restored from the power saving state.

As described above, according to the embodiment, in a period between the idle state and the power saving state, control can be performed so as to power on the HDDs only when the HDDS are required in the transition between the power saving states (for example, the PS1 ⇔ the PS2). As a result, appropriate power saving control can be performed by reducing the power saving control and the number of the powering on/off operations performed on each HDD. More specifically, by setting the power off-1 in the transition conditions of each HDD, control can be performed so that the HDD will be powered on only when an ATA command is received (that is, only when the HDD is truly required).

Other Embodiments

Embodiments of the present invention can also be realized by a computer of a system or apparatus that reads out and executes computer executable instructions (e.g., one or more programs) recorded on a storage medium (which may also be referred to more fully as a non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-011850, filed Jan. 26, 2018, which is hereby incorporated by reference herein in its entirety.

What is claimed is:

1. An information processing apparatus comprising:
  a first controller that includes an interface in compliance with a SATA (Serial Advance Technology Attachment) standard, wherein the first controller includes at least one first processor and at least one first memory;
  a second controller provided between the first controller and a storage device and including an interface in compliance with the SATA standard, wherein the second controller includes at least one second processor and at least one second memory;
  a main controller that includes at least one third processor and at least one third memory; and
  a power control circuit that is controlled by the second controller and controls a provision of power to the storage device,
  wherein the at least one first processor, the at least one second processor, and the at least one third processor are configured to deploy programs stored in the least one first memory, the at least one second memory, and the at least one third memory, respectively, the programs causing the information processing apparatus to:
  set the first controller, the second controller, and the storage device to a first controller power saving state, a second controller power saving state, and a storage device power saving state, respectively, in association with a power state of the information processing apparatus,
  transition the first controller to the first controller power saving state in accordance with the setting of the first controller and in response to a transition request from the main controller,
  transition the second controller to the second controller power saving state in accordance with the setting of the second controller and in response to the first controller power saving state to which the first controller has transitioned, and
  start a restoration processing of the first controller from the first controller power saving state in response to an interrupt from the main controller, start a restoration processing of the second controller in accordance with an interrupt from the first controller, obtain information regarding power control of the storage device from the second controller, and determine, based on the information regarding the power control of the storage device, whether or not to execute preprocessing that is accompanied by access to the storage device.

2. The information processing apparatus according to claim 1, wherein the power state of the information processing apparatus includes at least a first state in which activation is immediately possible, a second state that is a sleep state, and a third state in which power consumption has been further reduced from the power consumption in the second state, and
  wherein the first controller power saving state, the second controller power saving state, and the storage device power saving state are defined in compliance with the SATA standard in correspondence with each of the first to third states.

3. The information processing apparatus according to claim 2, wherein the setting of the storage device to the storage device power saving state includes stopping the provision of power to the storage device.

4. The information processing apparatus according to claim 2, wherein the first controller, the second controller, and the storage device all are set to a state corresponding to the third state in which the provision of power has been stopped.

5. The information processing apparatus according to claim 1, wherein the information regarding the power control of the storage device includes a status of a first control signal and a status of a second control signal, the first control signal for controlling a provision of power to the storage device and the second control signal for controlling whether or not to monitor the first control signal.

6. The information processing apparatus according to claim 5, wherein the programs further cause the at least one first processor of the first controller to determine to execute the preprocessing in accordance with the status of the first control signal indicating the provision of power to the storage device and the status of the second control signal indicating monitoring of the first control signal.

7. The information processing apparatus according to claim 1, wherein the programs further cause the at least one second processor of the second controller to start the restoration processing of the second controller from the second controller power saving state in accordance with the interrupt from the first controller.

8. The information processing apparatus according to claim 6, wherein the power state of the information processing apparatus includes at least a first state in which activation is immediately possible, a second state that is a sleep state, and a third state in which power consumption has been further reduced from the power consumption in the second state, and wherein the first controller power saving state, the second controller power saving state, and the storage device power saving state are defined in compliance with the SATA standard in correspondence with each of the first to third states, and
  wherein, when the first controller is to be restored from the first controller power saving state corresponding to one of the first state, the second state, and the third state, the programs further cause the at least one first processor of the first controller to not execute the preprocessing in accordance with the status of the first control signal not indicating the provision of power to the storage device and the status of the second control signal indicating monitoring of the first control signal, or the status of the first control signal indicating the provision of power to the storage device and the status of the second control signal not indicating monitoring of the first control signal.

9. The information processing apparatus according to claim 6, wherein the power state of the information processing apparatus includes at least a first state in which activation is immediately possible, a second state that is a sleep state, and a third state in which power consumption has been further reduced from the power consumption in the second state, and
  wherein the first controller power saving state, the second controller power saving state, and the storage device power saving state are defined in compliance with the SATA standard in correspondence with each of the first to third states, and wherein, when the first controller is to be restored from the first controller power saving state corresponding to the third state, the programs further cause the at least one first processor of the first controller to execute the preprocessing if the storage device is performing rebuild processing even if the status of the first control signal indicates the provision of power to the storage device and the status of the second control signal does not indicate monitoring of the first control signal.

10. The information processing apparatus according to claim 2, wherein, when the second controller is to be restored from the second controller power saving state corresponding to one of the first state and the second state, the programs further cause the at least one second processor of the second controller to execute the restoration processing of the second controller, the restoration processing of the second controller starting the provision of power to the storage device if the provision of power to the storage device is stopped.

11. The information processing apparatus according to claim 10, wherein, when the second controller is to be restored from the second controller power saving state corresponding to the third state, the programs further cause the at least one second processor of the second controller to transmit a request to the power control circuit to start the provision of power to the storage device if the power control circuit is not performing power control of the storage device.

12. The information processing apparatus according to claim 2, wherein the programs further cause the at least one third processor of the main controller to set conditions, to the second controller, for transitioning the first controller to the first controller power saving state, the second controller to the second controller power saving state, and the storage device to the storage device power saving state, and wherein the first controller power saving state, the second controller power saving state, and the storage device power saving state are defined in compliance with the SATA standard in correspondence with each of the first to third states.

13. The information processing apparatus according to claim 1, wherein the programs further cause the information processing apparatus to determine that the at least one processor of the second controller is performing power control of the storage device based on: a monitoring signal that indicates a state of providing power from the power control circuit to the storage device, and a request signal by which the at least one second processor of the second controller requests power control to the power control circuit.

14. The information processing apparatus according to claim 1, wherein the preprocessing includes at least a step of releasing a password lock of the storage device.

15. A method of controlling an information processing apparatus that includes (i) a first controller that includes an interface in compliance with a SATA (Serial Advance Technology Attachment) standard, the first controller having at least one first processor and at least one first memory, the at least one first processor being configured to deploy a program stored in the at least one first memory for implementing the method, (ii) a second controller that is provided between the first controller and a storage device and includes an interface in compliance with the SATA standard, the second controller having at least one second processor and at least one second memory, the at least one second processor being configured to deploy a program stored in the at least one second memory for implementing the method, (iii) a main controller having at least one third processor and at least one third memory, the at least one third processor being configured to deploy a program stored in the at least one third memory for implementing the method, and (iv) a power control circuit that is controlled by the second controller and controls a provision of power to the storage device, the method comprising:

setting the first controller, the second controller, and the storage device to a first controller power saving state, a second controller power saving state, and a storage device power saving state, respectively, in association with a power state of the information processing apparatus;

transitioning the first controller to the first controller power saving state in accordance with the setting of the first controller and in response to a transition request from the main controller;

transitioning the second controller to the second controller power saving state in accordance with the setting of the second controller and in response to the first controller power saving state to which the first controller has transitioned;

starting, for the first controller, a restoration processing from the first controller power saving state in response to an interrupt from the main controller;

starting a restoration processing of the second controller in accordance with an interrupt from the first controller;

obtaining, for the first controller, information regarding power control of the storage device from the second controller; and determining, for the first controller, based on the information regarding the power control of the storage device, whether or not to execute preprocessing that is accompanied by access to the storage device.

16. A non-transitory computer-readable storage medium storing a program for causing a processor to execute a method of controlling an information processing apparatus that includes (i) a first controller that includes an interface in compliance with a SATA (Serial Advance Technology Attachment) standard, the first controller having at least one first processor and at least one first memory, the at least one first processor being configured to deploy a program stored in the at least one first memory for implementing the method, (ii) a second controller that is provided between the first controller and a storage device and includes an interface in compliance with the SATA standard, the second controller having at least one second processor and at least one second memory, the at least one second processor being configured to deploy a program stored in the at least one second memory for implementing the method, (iii) a main controller having at least one third processor and at least one third memory, the at least one third processor being configured to deploy a program stored in the at least one third memory for implementing the method, and (iv) a power control circuit that is controlled by the second controller and controls a provision of power to the storage device, the method comprising:

setting the first controller, the second controller, and the storage device to a first controller power saving state, a second controller power saving state, and a storage device power saving state, respectively, in association with a power state of the information processing apparatus;

transitioning the first controller to the first controller power saving state in accordance with the setting of the first controller and in response to a transition request from the main controller;

transitioning the second controller to the second controller power saving state in accordance with the setting of the second controller and in response to the first controller power saving state to which the first controller has transitioned;

starting, for the first controller, a restoration processing from the first controller power saving state in response to an interrupt from the main controller;

starting a restoration processing of the second controller in accordance with an interrupt from the first controller;

obtaining, for the first controller, information regarding power control of the storage device from the second controller; and determining, for the first controller, based on the information regarding the power control of the storage device, whether or not to execute preprocessing that is accompanied by access to the storage device.

* * * * *